United States Patent
Maeda et al.

[19]

[11] Patent Number: 5,886,969
[45] Date of Patent: Mar. 23, 1999

[54] HIGH-DENSITY INFORMATION RECORDING/REPRODUCING METHOD

[75] Inventors: Takeshi Maeda, Kokubunji; Hisataka Sugiyama, Kodaira; Hiroyuki Awano, Nagareyama; Harukazu Miyamoto, Kodaira; Keikichi Andoo, Musashino; Kouichirou Wakabayashi, Kokubunji; Atsushi Saito, Hino; Takeshi Shimano, Tokorozawa; Junko Ushiyama, Kokubunji; Osamu Komoda, Kokubunji; Hideki Saga, Kokubunji, all of Japan

[73] Assignee: Hitachi, Ltd., Tokyo, Japan

[21] Appl. No.: 976,011

[22] Filed: Nov. 21, 1997

Related U.S. Application Data

[63] Continuation of Ser. No. 553,433, filed as PCT/JP95/00542, Mar. 24, 1995, which is a continuation-in-part of Ser. No. 321,619, Oct. 12, 1994, Pat. No. 5,703,846, and a continuation-in-part of Ser. No. 285,003, Aug. 2, 1994, Pat. No. 5,491,678, which is a continuation of Ser. No. 704,227, May 22, 1991, abandoned.

[30] Foreign Application Priority Data

| May 25, 1990 | [JP] | Japan | 2-133823 |
|---|---|---|---|
| Oct. 13, 1993 | [JP] | Japan | 5-255354 |
| Mar. 25, 1994 | [JP] | Japan | 6-055419 |
| Jul. 1, 1994 | [JP] | Japan | 6-150795 |

[51] Int. Cl.$^6$ .................................................. G11B 7/00
[52] U.S. Cl. ................................................ 369/100; 369/59
[58] Field of Search .............................. 369/100, 121, 369/118, 44.37, 44.23, 44.24, 110, 112, 46.26, 13, 59

[56] References Cited

U.S. PATENT DOCUMENTS

| 5,088,086 | 2/1992 | Van et al. . |
| 5,093,822 | 3/1992 | Kugiya et al. . |
| 5,315,573 | 5/1994 | Nakao et al. ............ 369/100 |
| 5,410,531 | 4/1995 | Tsujioka . |
| 5,434,840 | 7/1995 | Ezuka et al. . |

(List continued on next page.)

FOREIGN PATENT DOCUMENTS

| 2909770 | 3/1979 | Germany . |
| 4006275A1 | 2/1990 | Germany . |
| 61-73244 | 4/1986 | Japan . |

(List continued on next page.)

OTHER PUBLICATIONS

ECMA European Computer Manufacturers Association, "Standard ECMA–195", Date Intercharge on 130mm Optical Disk Cartridges–Capacity: 2 Gigabytes.
"Optical Components Replicated Optics", Philips Optics, Sep. 1994, pp. 1–28.

*Primary Examiner*—Thang V. Tran
*Attorney, Agent, or Firm*—Fay, Sharpe, Beall, Fagan, Minnich & McKee

[57] ABSTRACT

An optical recording/reproducing method employs a recording laser beam having a first output and a first wavelength, and a reproducing laser beam having a second output lower than the first output and a second wavelength shorter than the first wavelength. A disk-like recording medium is irradiated with the recording and reproducing laser beams by use of an objective lens having an NA of about 0.55 so that a small mark equal to or smaller than about one fourth of a spot size optically defined from the wavelength of the recording laser beam and the NA of the objective lens is formed on the recording medium by a recording characteristic of the recording medium and a shielding plate provided in an optical system for irradiation with the laser beam. Two-dimensional recording is performed as a recording system to arrange marks at lattice points of a two-dimensional lattice which extend in a track direction and a track radius direction. The reproducing system detects a reproduction signal from the mark on the two-dimensional lattice point, and the reproduction signal from each mark is used to perform a signal processing, thereby detecting information.

7 Claims, 42 Drawing Sheets

U.S. PATENT DOCUMENTS

| | | |
|---|---|---|
| 5,436,885 | 7/1995 | Okumura et al. . |
| 5,438,561 | 8/1995 | Van et al. . |
| 5,581,531 | 12/1996 | Ito et al. .............................. 369/100 |
| 5,590,110 | 12/1996 | Sato . |
| 5,612,942 | 3/1997 | Takahashi .............................. 369/100 |

FOREIGN PATENT DOCUMENTS

| | | |
|---|---|---|
| 61-140443 | 8/1986 | Japan . |
| 61-182651 | 8/1986 | Japan . |
| 63-14342 | 1/1988 | Japan . |
| 63-48625 | 3/1988 | Japan . |
| 1-130326 | 5/1989 | Japan . |
| 1-315029 | 12/1989 | Japan . |
| 2-263336 | 10/1990 | Japan . |
| 03-273543 | 12/1991 | Japan . |
| 4-232617 | 8/1992 | Japan . |
| 5-250679 | 9/1993 | Japan . |
| 5-298768 | 11/1993 | Japan . |
| 06-150364 | 5/1994 | Japan . |
| 6-215439 | 8/1994 | Japan . | ratio α = r' / r

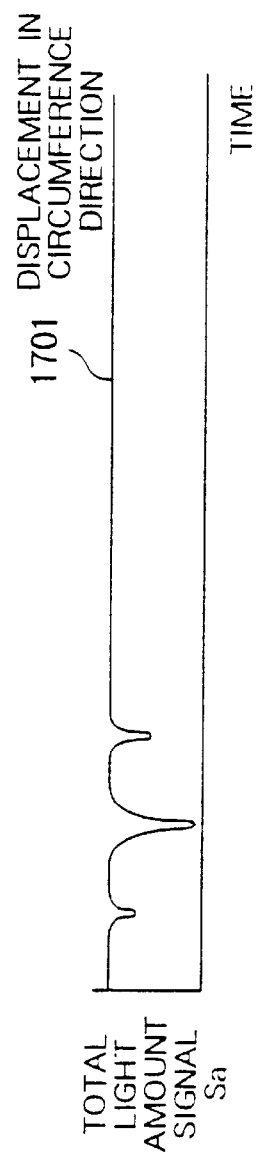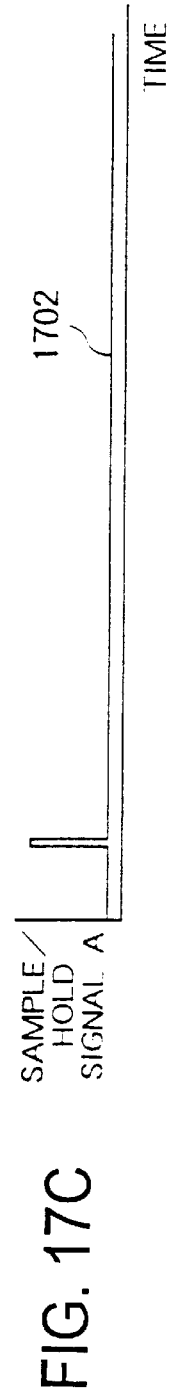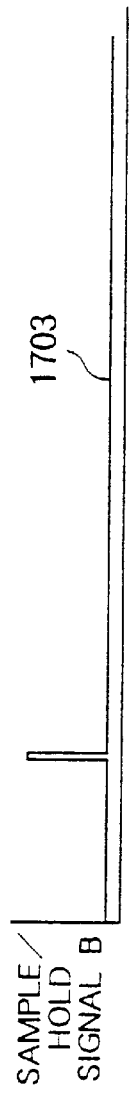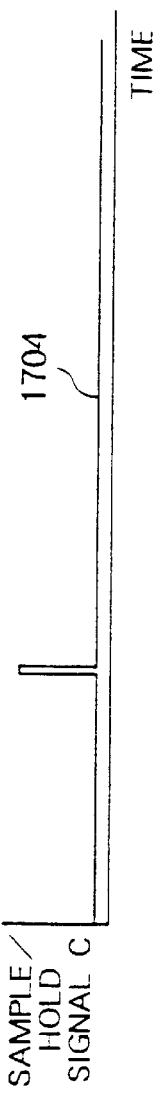
FIG. 17A  FIG. 17B  FIG. 17C  FIG. 17D  FIG. 17E

OPTICAL DISK CIRCUMFERENCE DIRECTION $S_{N,M} = S_{N,M} + a S_{N+1,M-2} + b S_{N+1,M-1} + c S_{N+1,M} + d S_{N+1,M+1} + e S_{N+1,M-2}$
$+ f S_{N,M-2} + g S_{N,M-1} + h S_{N,M+1} + i S_{N,M+2}$
$+ j S_{N-1,M-2} + k S_{N-1,M-1} + l S_{N-1,M} + m S_{N-1,M+1} + n S_{N-1,M+2}$

TRACK 1
TRACK 2
TRACK 3

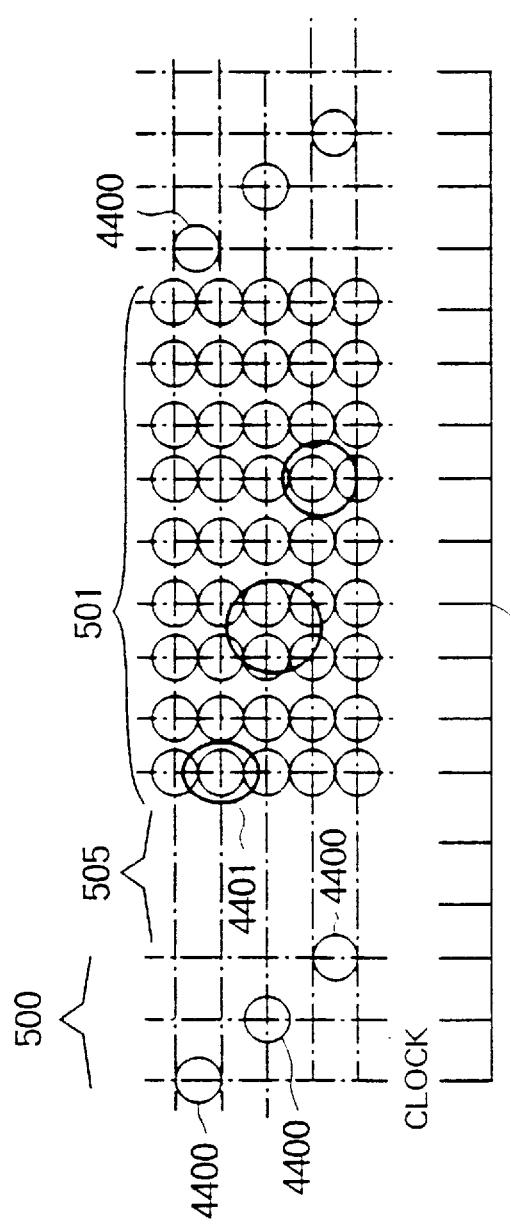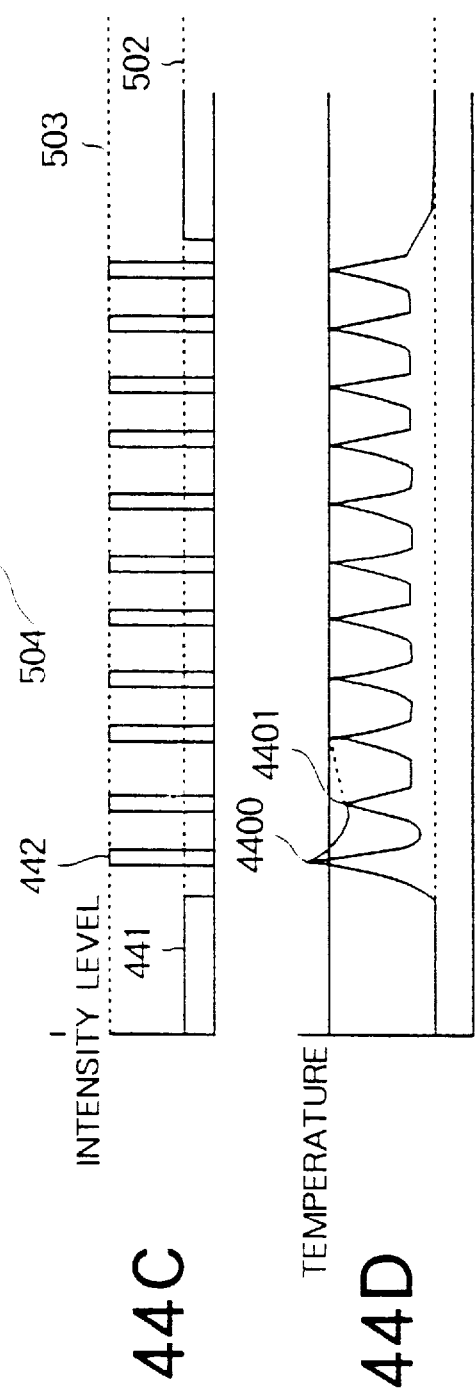
FIG. 44A
FIG. 44B
FIG. 44C
FIG. 44D

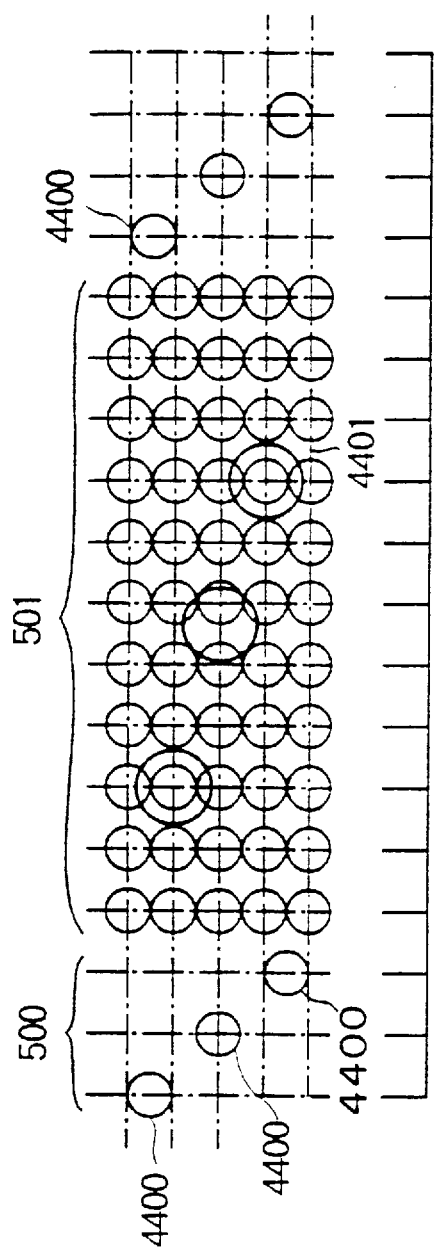
FIG. 52A
FIG. 52B
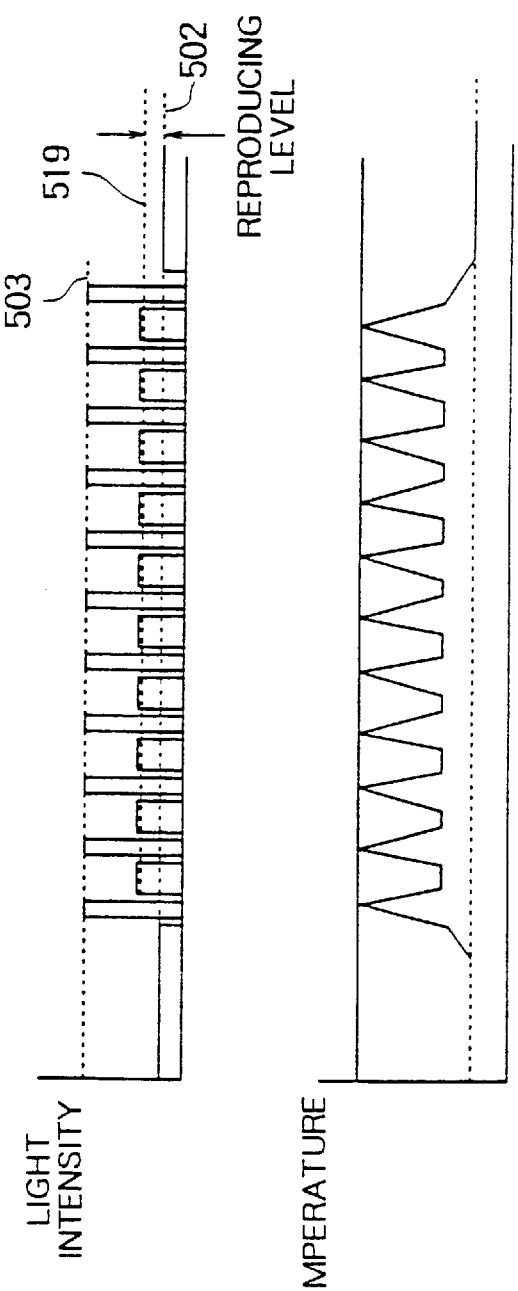
FIG. 52C
FIG. 52D

HIGH-DENSITY INFORMATION RECORDING/REPRODUCING METHOD

This is a Continuation application of U.S. Ser. No. 08/553,433, filed Nov. 20, 1995, which is a 371 of PCT/JP95/00542 filed Mar. 24, 1995; which is a Continuation-in-part of 08/321,619 filed Oct. 12, 1994, now U.S. Pat. No. 5,703,846, and a Continuation-in-part of 08/285,003 filed Aug. 2, 1994, now U.S. Pat. No. 5,491,678; which is a Continuation of 07/704,227 filed May 22, 1991, now abandoned.

TECHNICAL FIELD

The present invention relates to a system for optically recording and reproducing information, and more particularly to an improvement in the recording/reproduction density of an optical disk device that employs a disk-like medium.

BACKGROUND ART

At the present time, the surface density of commercially available optical disk devices is on the order of about 880 megabits per square inch. A surface density capable of being generally realized at the research and development level while overcoming the strict environmental conditions for using optical disk devices is said to be about three times as high as the surface density realized at the product level. In commercially available optical disk devices, a wavelength of 780 nm is used, the numerical aperture (NA) of the objective lens is 0.55, mark length recording is used as a recording system, and continuous servo is used as a servo system. "Standard ECMA-195" is a reference article by ECMA (European Computer Manufacturer Association) containing standards for data interchange on 130 mm optical disk cartridges.

An object of the present invention is to realize the highest density recording/reproducing characteristic of an optical disk while using constituent elements which are realizable at the present time. A recording density of 10 Gbit/in$^2$ can be realized.

DISCLOSURE OF THE INVENTION

The gist of the present invention is summarized as follows.

(1) A semiconductor laser having an output of 50 mW and a wavelength of 680 nm is used as a recording laser, and an SHG (Second Harmonic Generator) for oscillating the wavelength of 530 nm with an output equal to or higher than 15 mW is used as a reproducing light source.

(2) An objective lens is used which has an NA of 0.55, and which is corrected for chromatic aberration for recording and reproducing wavelengths.

(3) There is used a recording medium in which a small mark can be formed, no larger than about one fourth of a spot size determined from the laser wavelength and the NA of the objective lens. Further, there is also used a medium which has a super-resolution characteristic using a difference in a temperature dependent magnetic characteristic among the layers of a multi-layer magnetic film.

(4) The optical system is a super-resolution optical system by which a spot size on a disk surface can be made smaller than the spot size determined from the laser wavelength and the NA of the objective lens. Also, there is used a construction with which plural spots can be produced at the time of recording or reproducing.

(5) The recording system is a two-dimensional recording system in which marks having the same circular form are arranged at lattice points of a two-dimensional lattice which extend in a track direction and in a track radius direction.

(6) In the reproducing system, a reproduction signal from a mark on the two-dimensional lattice point is detected and the reproduction signals from respective marks are used to perform a signal processing, thereby detecting information. In this case, a light pulse is irradiated with a peak power larger than the power at the time of irradiation with ordinary DC light, and at a timing synchronous with the lattice point, and the reflected light is detected at a timing synchronous with the lattice point.

(7) A so-called sample servo system is used for tracking so that a recording clock signal and a reproducing clock signal are generated from buried pits which are discretely provided, and a tracking error signal is detected from wobbling marks.

The recording is made using a conventional high-output laser of 680 nm wavelength, which is capable of direct modulation. The spot size is on the order of 1.23 microns. Using an optical super-resolution effect and taking the efficiency of optical output into consideration, the spot size is reduced to 0.87 microns which is about 70% of 1.23 microns. This reduced spot is used to record a mark of 0.22 micron diameter in a medium in which a mark equal to or smaller than one fourth of the recording spot can be formed. The construction of the medium is as follows.

(1) The medium is provided with a buried mark layer in which small marks having a target form on the order of 0.22 microns are recorded beforehand. A recording spot is positioned on the buried mark layer by sample servo to generate a clock signal from the buried pits. In accordance with the generated clock signal, an information mark is recorded in a reproducing layer on the basis of whether or not the buried mark is to be magnetically transferred. The mark recorded in the reproducing layer provides a small mark which conforms to the form of the buried mark but does not depend on the recording spot.

(2) A recording sensitivity characteristic of the medium is locally changed in a small region to form a small mark which does not depend on the recording spot. More particularly, a recording film is irradiated with a strong laser beam to generate a localized structure relaxation, thereby weakening the coercive force.

(3) In order to facilitate the localized formation of recording marks, a minute concave/convex pattern is provided beforehand on the substrate of an optical disk by injection to provide nuclei for the formation of magnetic marks, thereby forming small marks which do not depend on the recording spot.

Using sample servo, a single or plural spots are positioned on the thus formed marks. When a light spot is positioned on a two-dimensional lattice point, the pulsed irradiation is made in accordance what a clock signal generated from buried marks. The reflected light is detected or sampled and held at a timing synchronous with the lattice point. The amount of interference from an adjacent lattice point is determined beforehand in a learning region. A processing is performed for eliminating the amount of interference from the detection signal after sample-and-hold, to detect the presence/absence of a mark recorded at the lattice point.

BRIEF DESCRIPTION OF THE DRAWINGS

FIGS. 17A–17E illustrate a tracking error signal detecting process of the present invention;

FIG. 40 is a diagram for explaining signals detected from marks at lattice point intervals and a processing area in the present invention;

FIGS. 44A to 44D are diagrams for explaining the principle of a reproducing system based on pulsed irradiation;

FIGS. 52A to 52D are diagrams for explaining a second reproducing system based on pulsed irradiation.

BEST MODE FOR CARRYING OUT THE INVENTION

Figure 1:
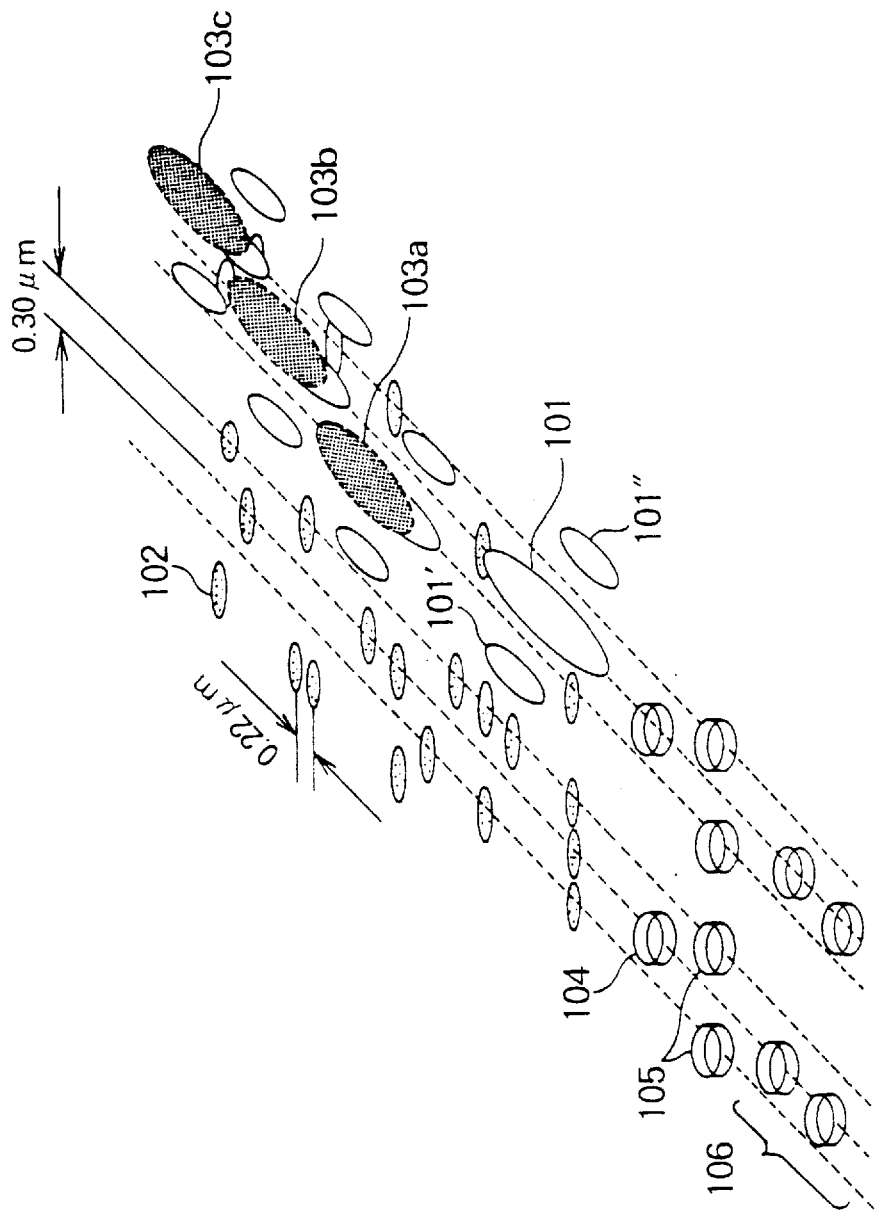
FIG. 1 is a plan view for explaining a relationship between record marks and recording/reproducing spots in the present invention.

FIG. 1 shows an appearance of a recording medium of the present invention.

Recording spots 101, 101' and 101" are obtained by use of a semiconductor laser of 685 nm wavelength as a light source and through optical super-resolution in the radius direction of an optical disk. A laser beam from the semiconductor laser is focused on the surface of the disk by use of an optical system having a numerical aperture (NA) of 0.55 so that the size of the recording spot 101 is 1.24 μm in the disk circumference direction and 0.87 μm in the disk radius direction. The size of a recorded information mark 102 is about 0.22 μm in the disk circumference direction and about 0.30 μm in the disk radius direction. The minimum interval between the information marks 102 is about 0.22 μm. The track pitch is about 0.30 μm. Reproducing spots 103a, 103b and 103c are formed with a size of 0.96 μm in the disk circumference direction and 0.67 μm in the disk radius direction by use of a laser of 533 nm wavelength and through magnetic super-resolution (FAD) and optical super-resolution which will be described later. Clock marks 104, wobbling marks 105, address marks 106 and so forth have a concave/convex form and are formed preceding the information marks 120.

Figure 2:
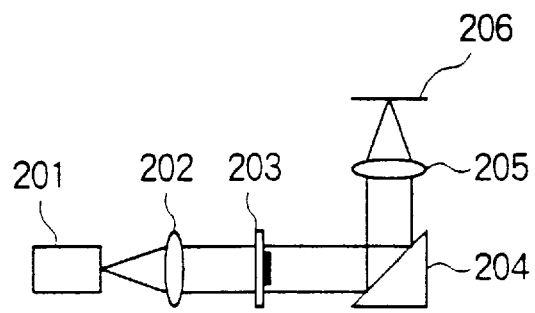
FIG. 2 is a block diagram showing the construction of an optical system for optical super-resolution in the present invention.

FIG. 2 shows a specific construction for optical super-resolution. Light from a semiconductor laser 201 is collimated by a coupling lens 202. The collimated light beam is introduced to an objective lens 205 through a prism 204 or the like and is focused on an imaging plane 206 by the objective lens 205. This optical path includes a shielding plate 203 inserted therein.

Figure 3:
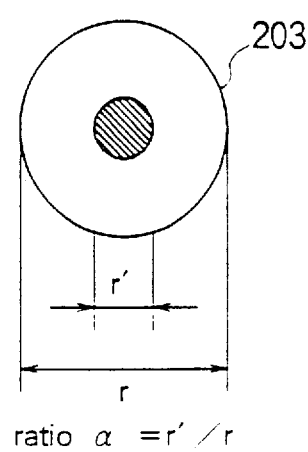
FIG. 3 is a diagram for explaining the construction of an optical filter for optical super-resolution in the present invention.

FIG. 3 shows the details of the shielding plate 203. The shielding plate 203 intercepts that part of the light beam (diameter r) which corresponds to a diameter r' around the optical axis. A shielding ratio α is defined by the ratio of r' to r (or r'/r). As the shielding ratio α is increased, other light spots appear on both sides of the focused central spot on the imaging plane 206 and the center intensity of the central spot between the side spots is decreased. The size of the central spot becomes small. These spots correspond to the spots 101, 101' and 101" shown in FIG. 1.

Figure 4:
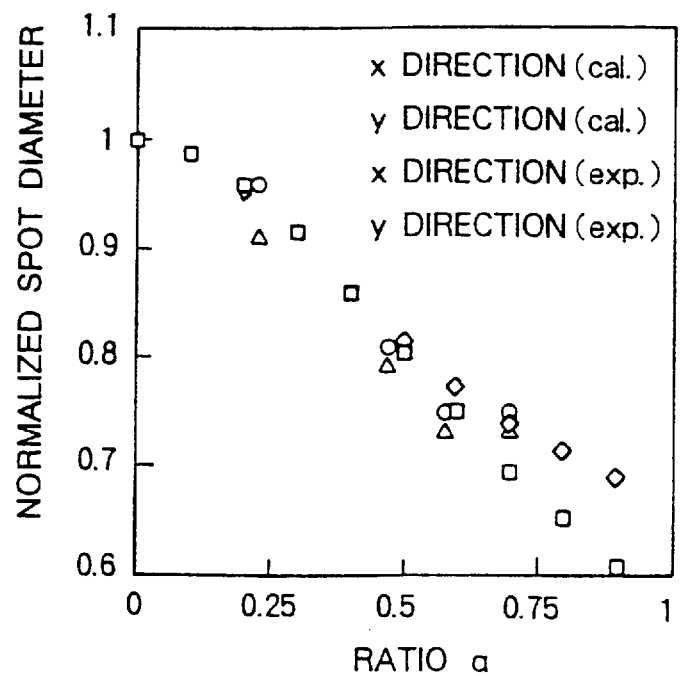
FIG. 4 is a graph for explaining the effect of optical super-resolution in the present invention.

The relationship between the shielding ratio α and the spot size is shown in FIG. 4. In FIG. 4, "exp." and "cal." represent experimental and calculated values, respectively. The reference value for a normalized spot diameter is a spot diameter in the case where the shielding ratio is 0. In the case where the spot size is reduced to about 0.7, the shielding ratio is about 0.7 and the center intensity of the spot is reduced to about 50%. Though the intensity of each side spot in this case is about 20% of that of the central spot, no problem is generated since the side spots cannot exert a recording action at the time of recording.

Explanation will now be made of the principle in accordance with which a mark having a size equal to about one fourth of a spot size is formed using the above-mentioned recording spot. The magnetic domain wall of an opto-magnetic mark is determined by the stability condition of a magnetic energy. Provided that $\sigma_w$ is the domain wall energy per unit area, $M_s$ the saturation magnetization, r the radius of the magnetic domain, $H_d$ a diamagnetic field acting on the domain wall and $H_{ext}$ an external magnetic field, the total $H_{total}$ of magnetic fields providing the source of a force to expand the domain wall is represented by the following equation (1):

$$H_{total}=H_{ext}+H_d-\sigma_w/2rM_s \qquad (1)$$

The domain wall is defined at a location where the coercive force $H_c$ of a recording film and $H_{total}$ are balanced with each other.

Figure 5:
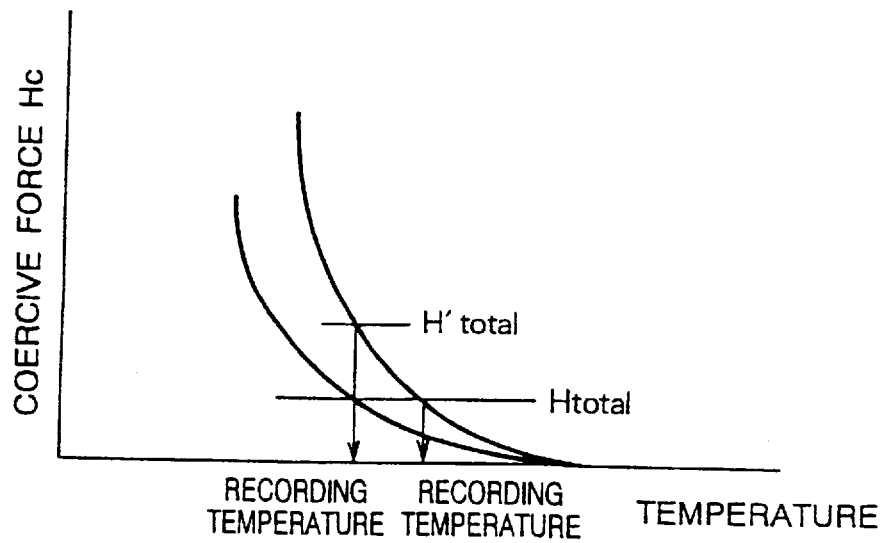
FIG. 5 is a graph for explaining a relationship between the coercive force and the temperature on a recording film.

A general relationship between the coercive force $H_c$ and the temperature is shown in FIG. 5. The irradiation of a recording film with a laser beam causes a change in the temperature distribution on the recording film so that a domain wall stands still at a location where $H_{total}$ and $H_c$ are balanced with each other in FIG. 5 at a recording film temperature $T_{rec}$. Thereby, an inversely magnetized mark is formed. The stability of the record mark can be represented by the amount of change in position of the domain wall or change in form of the magnetization mark relative to a change in power.

Figure 6:
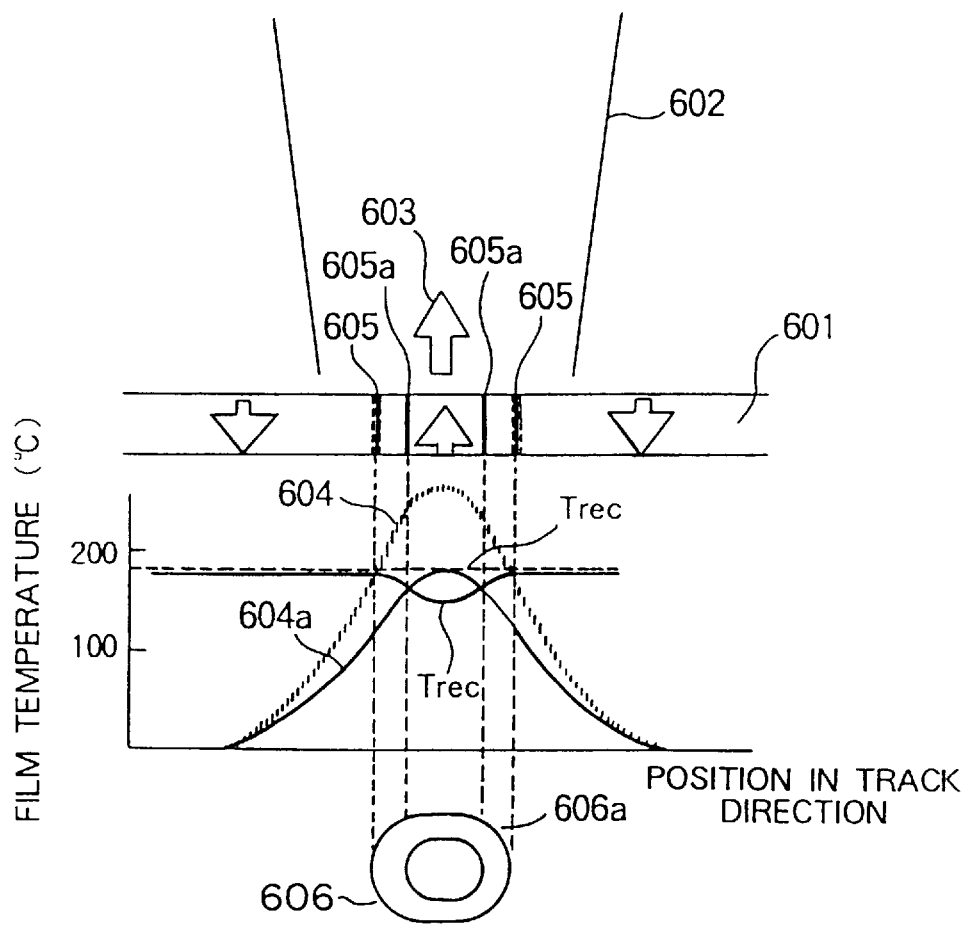
FIG. 6 is a diagram for explaining a magnetization mark recording process.

FIG. 6 shows the principle of formation of the magnetization mark. A perpendicularly magnetized film 601 is irradiated with a light beam 602 while an external magnetic field 603 is applied. Thereby, a magnetization mark is formed. Generally, the recording temperature $T_{rec}$ is the same over the whole of a disk surface, as shown by a dotted line. The domain wall of the magnetization mark is determined by the intersection of the temperature distribution 604 developed by the light beam irradiation and the recording temperature $T_{rec}$. A domain wall 605 was thus formed on the perpendicularly magnetized film 601. The magnetization mark 606 formed at this time took a stable condition with a width equal to about one half of the spot size.

In the present invention, however, the coercive force characteristic shown in FIG. 5 or the above-mentioned $H_{total}$ is locally changed to change the recording temperature to $T'_{rec}$ so that the recording temperature characteristic on the disk surface is locally lowered. Further, a portion having the locally lowered recording temperature is irradiated with a light spot to develop a temperature distribution 604a. Thus, the intersection of the recording temperature $T'_{rec}$ and the temperature distribution 604a is positioned at a peak portion of the temperature distribution. As a result, a domain wall 605a is formed on the perpendicularly magnetized film and the width of a magnetization mark 606a becomes narrower than that of the magnetization mark 606 formed in the conventional system. In the conventional system, a change of the intersection in a peak portion of the temperature distribution relative to a change of the temperature distribution was large and hence the mark was not stable. According to the present invention, on the other hand, the change of the intersection relative to the change of the temperature distribution is suppressed since the gradient of the recording temperature with respect to position has a reverse polarity to that of the gradient of the temperature distribution with respect to position. Thus, a small mark can be formed stably with a recording energy lower than that required in the conventional system.

There are two methods of changing the recording temperature. In one method, the coercive force characteristic of the medium is locally changed. In the other method, $H_{total}$ is locally changed. The method of locally changing the coercive force of the medium will be explained using FIGS. 7 to 9.

Figure 7A:
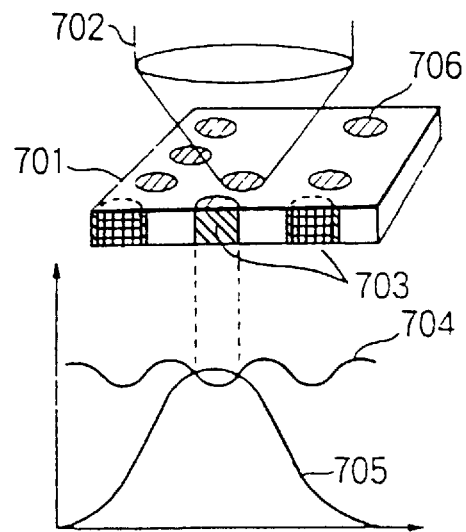
FIGS. 7A and 7B are diagrams for explaining the construction of an embodiment of a medium according to the present invention and the result of measurement.
Figure 7B:
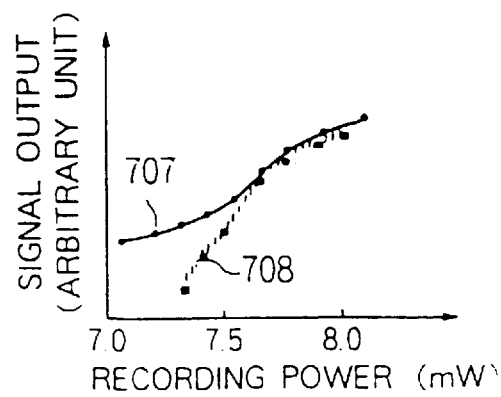

FIGS. 7A and 7B show an example in which a localized structure relaxation is generated on a disk. The term "structure relaxation" means the local weakening of the coercive force of the recording medium by deteriorating the magnetic anisotropy through an annealing action.

FIG. 7A shows a situation in which recording on a recording medium 701, including structure relaxation therein, is made with a light beam 702. In a portion 703 subjected to the structure relaxation, the temperature-dependent coercive force characteristic shown in FIG. 5 is locally deteriorated but $H_{total}$ has no change. Therefore, the effective recording temperature 704 is lowered. Accordingly, when a temperature distribution 705 is developed by the light beam, a small magnetization mark 706 is formed.

The quantity of deterioration of the coercive force depends on the energy applied for annealing. According to one method for annealing, the localized irradiation with light having a high energy is made to cause structure relaxation by temperature. In this method, the quantity of localized deterioration of the coercive force is changed depending on the high energy distribution, and the recording temperature is correspondingly changed.

In order to narrow the localized region, it is preferable to effect the recording by a spot smaller than a recording spot. At the present time, the recording spot is determined by the recording wavelength 680 nm and the numerical aperture 0.55. However, in order to cause the structure relaxation, a laser of short wavelength and a lens of large numerical aperture, which are used at the time of fabrication of a master optical disk, can be used. The existing laser-lens combination can provide a spot size which is on the order of 0.45 microns. Accordingly, a region subjected to annealing can be narrowed to the order of 0.2 microns.

FIG. 7B shows the measured data 707 of a reproduction output in the case where the recording is made on a medium subjected to structure relaxation. Data 708 obtained in the case of the conventional system is also shown for comparison. In the case of the conventional system, as the recording power is lowered, the intersection of recording temperature and temperature distribution gets near a peak point so that a mark has a sudden change for the change of recording power, thereby deteriorating the reproduction output. On the other hand, in the case where a mark is recorded after the subjection of the medium to structure relaxation, the reproduction signal for high recording power is no different from that in the conventional case since a mark substantially similar to the mark in the conventional system is formed when the mark is larger than the structure-relaxed region. However, as the recording power is lowered, the change in output level is smaller since a change in mark width corresponding to a change in recording power becomes small when the record mark is laid across the structure-relaxed region.

Figure 8A:
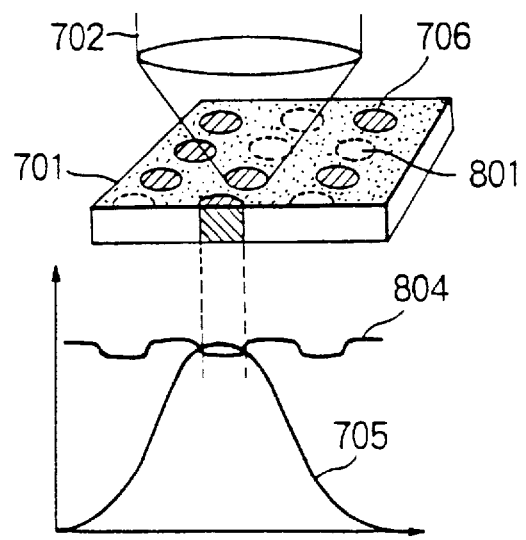
FIGS. 8A and 8B are diagrams for explaining the construction of another embodiment of a medium according to the present invention and the result of measurement.
Figure 8B:
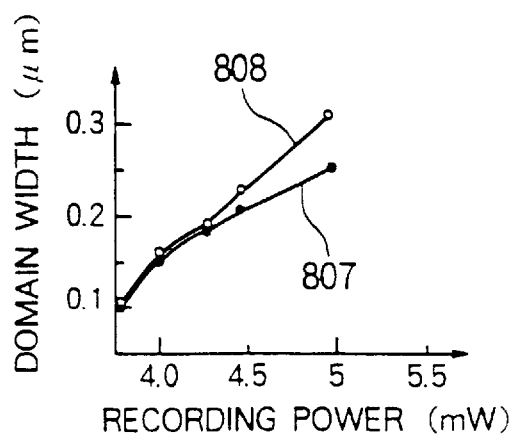

FIGS. 8A and 8B are shown for explaining an example in which the coercive force of a region of a recording medium subjected to the formation of a record mark is made the same as the coercive force in the conventional system, and the coercive force of the other region is enhanced.

A medium of the present invention is shown in FIG. 8A. The surface roughness of portions of a perpendicularly magnetized film 701 other than those portions subjected to the formation of magnetization marks 706 is made large to improve the coercive force. Namely, only the portion to be subjected to the formation of the magnetization mark 706 is provided with a flat portion 801. In those portions other than the flat portion 801, the surface energy for bringing the domain wall to a standstill is increased, thereby making it possible to enhance the apparent coercive force. With this construction, the recording temperature 804 is relatively lowered in the mark region.

According to one method of providing a large surface roughness, there is used a resist material which has such a property that only a portion irradiated with light is crosslinked and the crosslinked portion is insoluble in a developer. Then, small mark portions in a two-dimensional lattice point form are irradiated with light. In the developing process, the surface excepting the two-dimensional lattice points is made coarse through etching by a developer having a high concentration. A stamper is fabricated from the thus formed master disk and a plastic material is stamped with the coarsened surface. Thereby, the roughness of the surface portion surrounding the small mark can be made large.

FIG. 8B shows the relationship between the width of a magnetic domain and the recording power. Data 807 represents the relationship between the recording power and the width of a magnetic domain formed in the case where a stripe-like flat portion having a width of 0.2 μm is formed and the surface roughness on both sides of the flat portion is made large. It is seen that the width of the formed magnetic domain is small as compared with data 808, obtained in the case where the surface roughness is not made large.

Figure 9A:
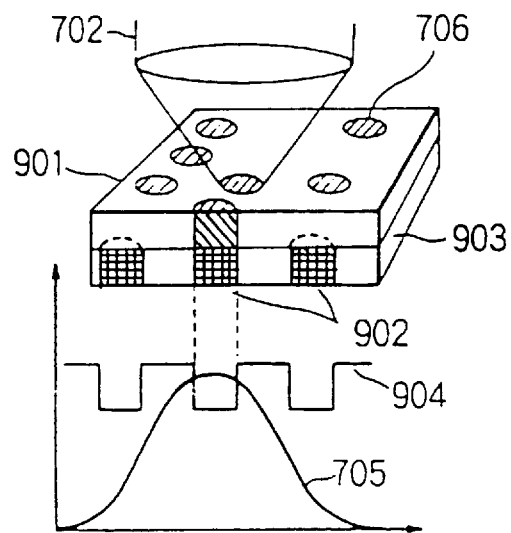
FIGS. 9A and 9B are diagrams for explaining the construction of a further embodiment of a medium according to the present invention and the result of measurement.
Figure 9B:
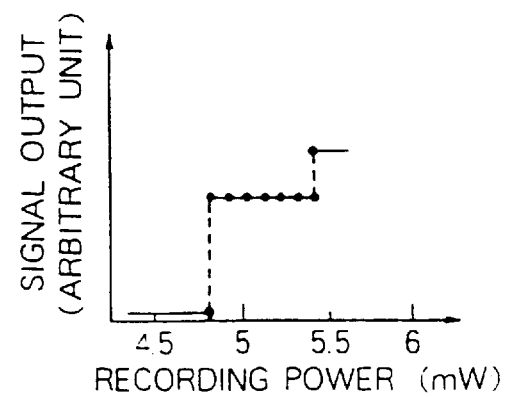

FIGS. 9A and 9B show an example in which the magnetic field is locally changed.

As shown in FIG. 9A, a layer 903, in which small magnetization marks 902 have been buried beforehand, is provided magnetically adjoining a recording film 901. The small magnetization marks 902 are two-dimensionally arranged and an external magnetic field on the recording film 901 adjoining the buried mark layer 903 is increased by a proportion corresponding to a magnetic field generated by the magnetization mark 902, thereby changing the effective $H_{total}$.

This action will now be explained using FIG. 5. Even if the magnetic characteristic of the recording film is not changed, the change from $H_{total}$ in the conventional system to $H'_{total}$ caused by the magnetization by the buried mark lowers the recording temperature from $T_{rec}$ to $T'_{rec}$. Accordingly, the recording temperature 904 of the buried mark of FIG. 9A is lowered. Therefore, if the temperature on the recording film is increased as shown by a curve 705, there is formed a record mark 706 which corresponds to the buried mark region where the recording temperature is lowered. FIG. 9B shows the relationship between mark forming power at the time of recording and output signal when the formed mark is reproduced.

Next, an explanation will be made of a method of forming a small domain by changing the composition of the recording film. The basic construction of an opto-magnetic recording film includes an amorphous structure including three atoms of Tb, Fe and Co. A difference in the perpendicular magnetization characteristic is generated depending on the proportions of Tb and Fe.

Figure 10A:
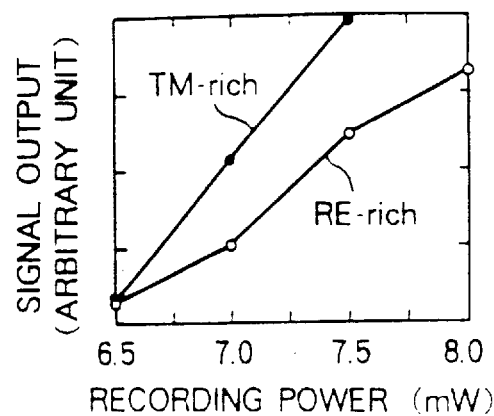
FIGS. 10A and 10B are graphs showing the magnetization mark control performance of a TbFeCo composition.

FIG. 10A shows a relationship between the coercive force and the temperature for each of a TM-rich composition which abounds in Fe and an RE-rich composition which abounds in Tb. The gradient of the temperature-dependent coercive force characteristic of the RE-rich composition is large as compared with that of the TM-rich composition. Regarding the relationship between recording temperature and record mark, when the coercive force characteristic as explained in conjunction with FIG. 5 takes the form shown in FIG. 10, a mark smaller than that of the conventional system can be formed stably, and a change in record mark for a change in $H_{total}$ is suppressed.

Figure 10B:
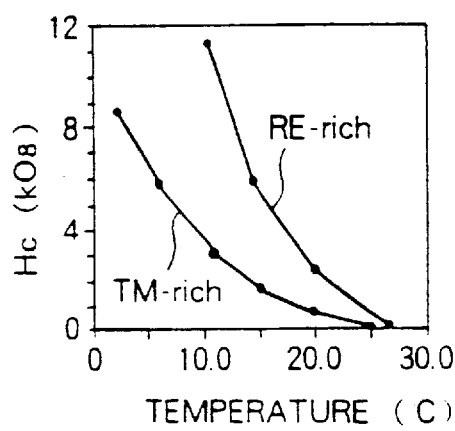

FIG. 10B shows the relationship between recording power and signal output. For the above-mentioned reason, the dependency of the signal output on the recording power for the RE-rich composition is less than that for the TM-rich composition.

The reason will be explained in more detail by use of FIGS. 11, 12, 13 and 14.

Figure 11:
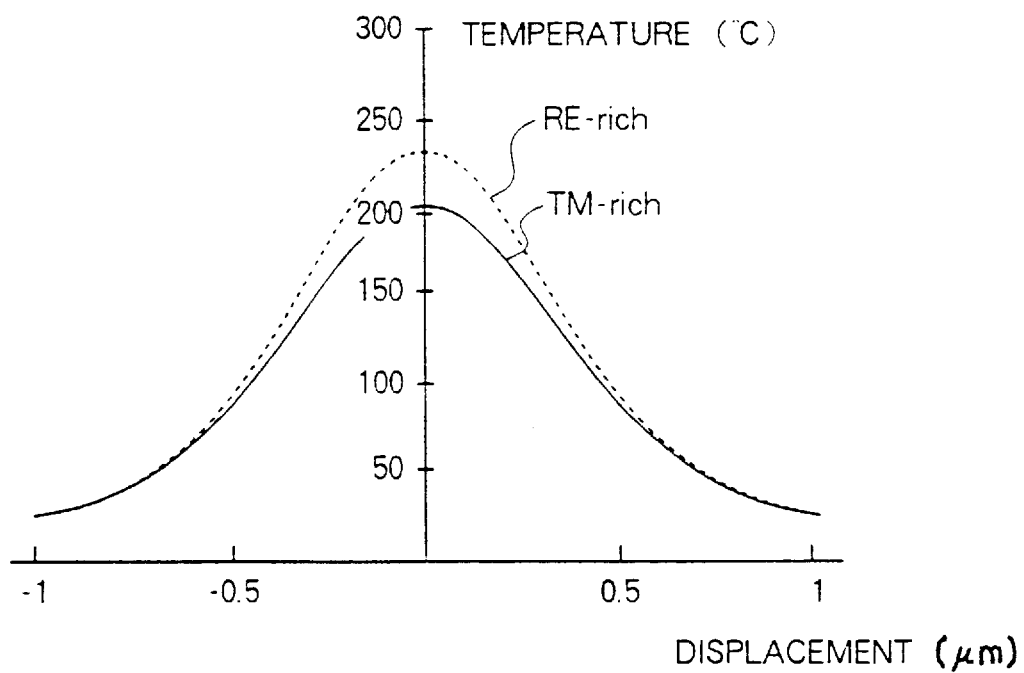
FIG. 11 is a graph showing a temperature distribution generated by irradiation with a light spot.

FIG. 11 shows a temperature distribution for each medium in the case where the medium is at a room temperature of 20° C. and is irradiated with a laser beam. It is known that the temperature distribution on a medium, when the medium is irradiated with a short pulse beam, is substantially equal to the spot profile.

Figure 12:
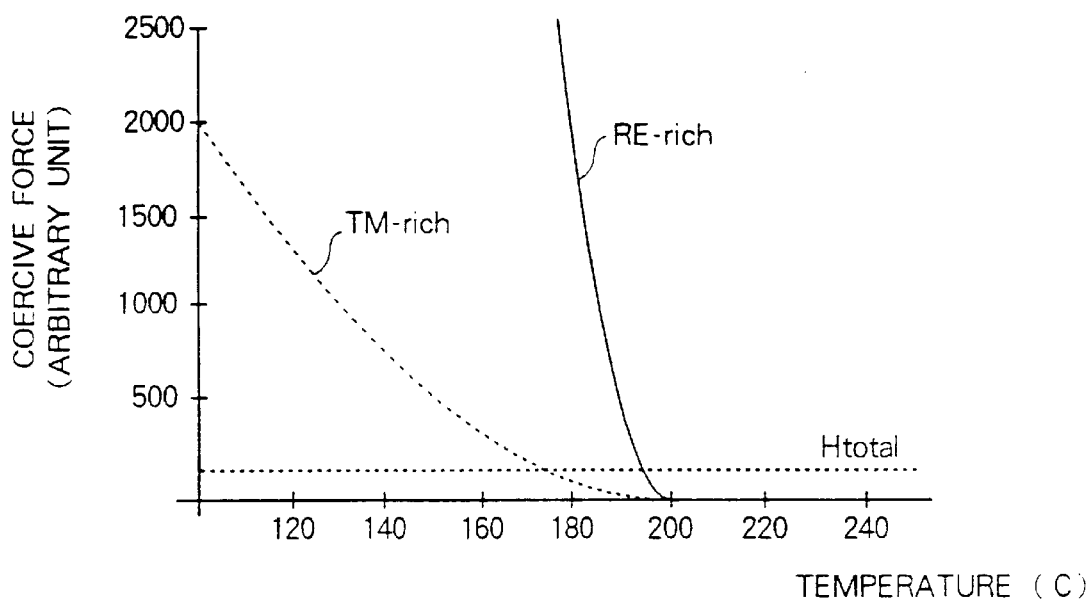
FIG. 12 is a graph showing a relationship between coercive force and recording temperature.

FIG. 12 shows the coercive force characteristic of each medium corresponding to FIG. 10A. A record mark of 0.2 microns is formed in accordance with a recording temperature determined from this coercive force characteristic and $H_{total}$.

Figure 13:
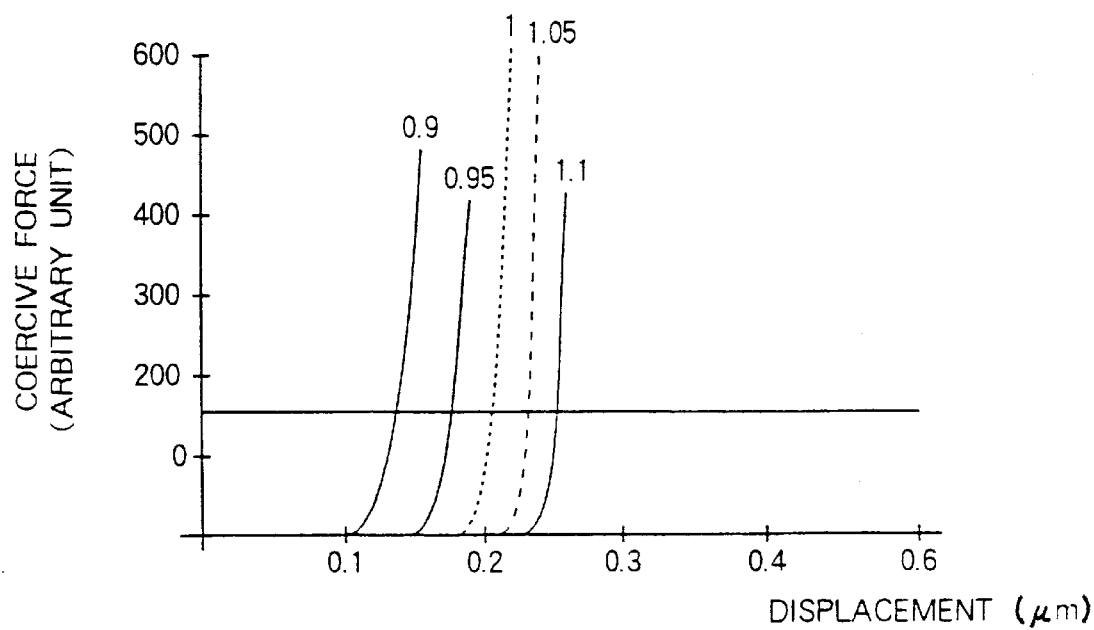
FIG. 13 is a graph showing the change of mark diameter in an RE-rich composition which is caused by the change of recording power.
Figure 14:
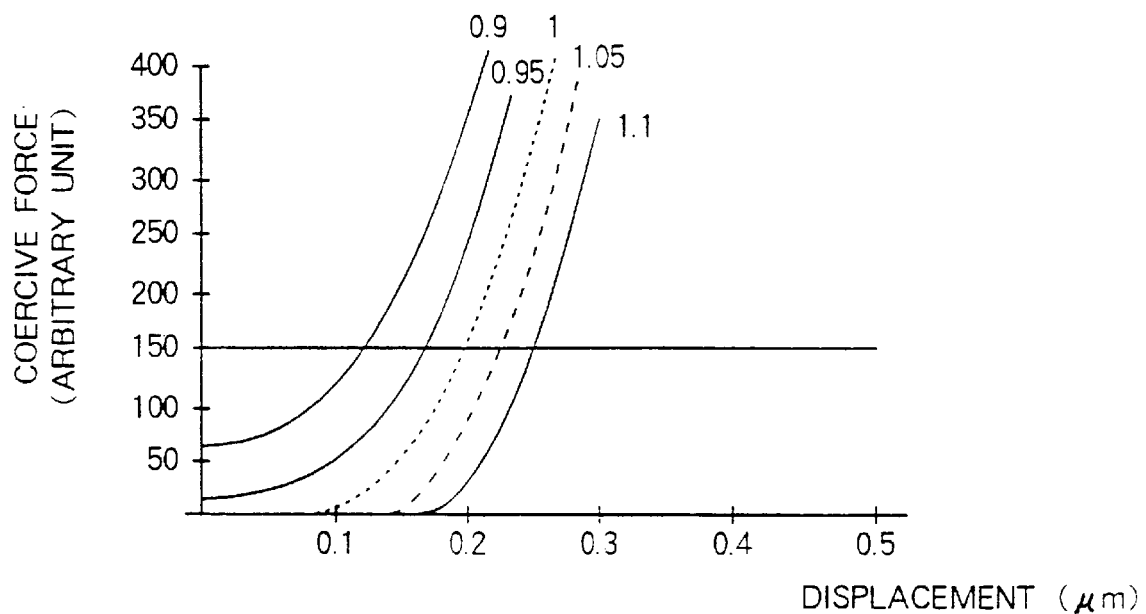
FIG. 14 is a graph showing the change of mark diameter in a TM-rich composition which is caused by the change of recording power.

The relationship between mark displacement and coercive force in the case of the temperature distribution shown in FIG. 11 is represented in FIG. 13 for an RE-rich medium and in FIG. 14 for a TM-rich medium. When the recording power is changed from 0.9 times to 1.1 times as large as the value with which a record mark having a diameter of 0.2 microns can be formed, a change in mark is determined from the intersection of $H_{total}$ and the coercive force characteristic. As a result, it is found that a change in mark width for the RE-rich medium is smaller than that for the TM-rich medium. When the recording is made by the identical spot, the use of the recording film structure shown in FIGS. 7 to 9 and the RE-rich recording medium makes it possible to form a record mark having a width which is on the order of one half of that formed in the conventional system.

Figure 15:
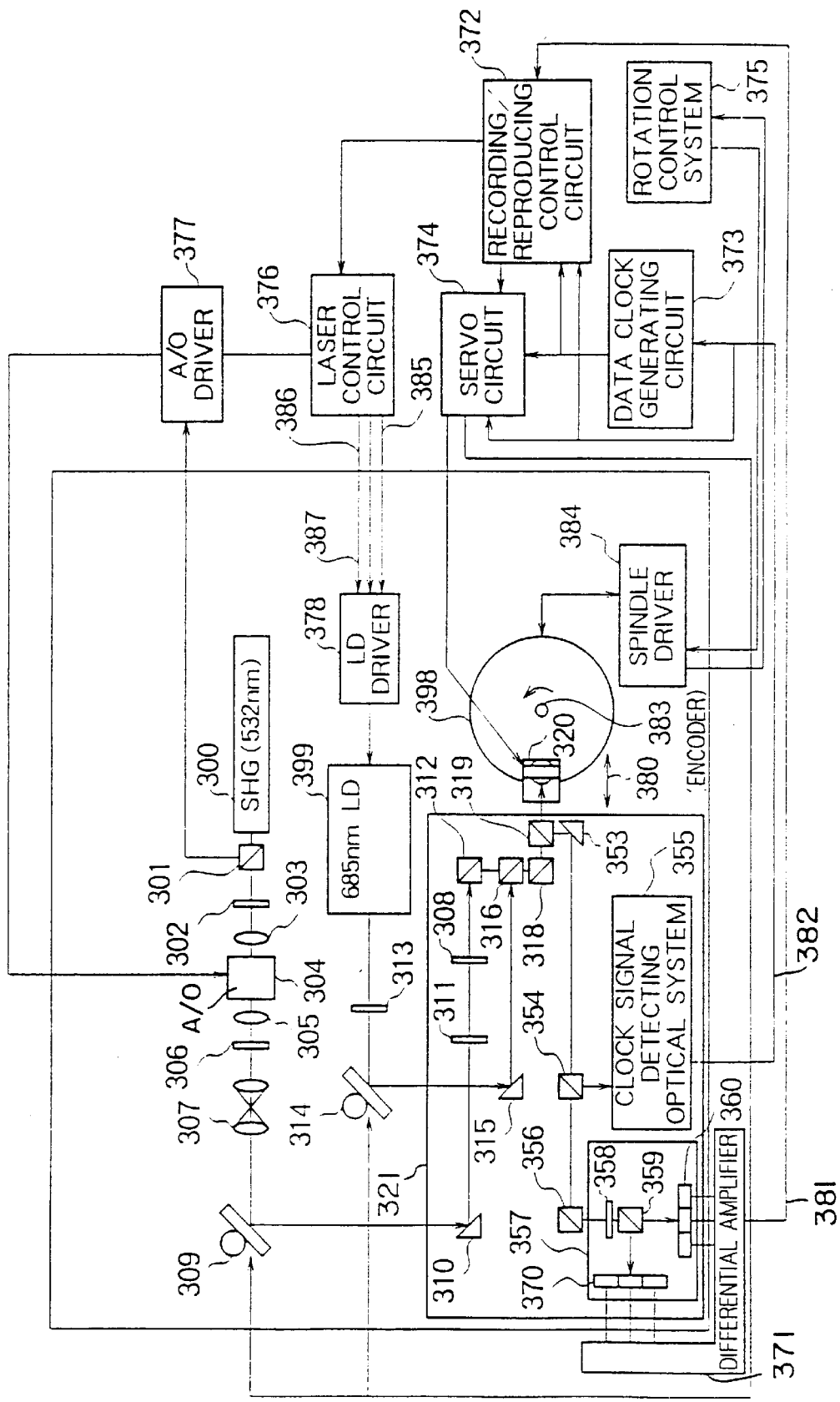
FIG. 15 is a block diagram showing the construction of a recording/reproducing system according to the present invention.

FIG. 15 is a block diagram showing a construction of a recording/reproducing system according to the present invention.

A laser beam of 532 nm wavelength emitted from an SHG 300, which is a reproducing light source, is passed through a slit 302 and is then converged by a cylindrical lens 303 in one direction. Reference numeral 301 denotes a detector system for detecting a part of the laser beam to control an A/O driver circuit 377 so that the strength of the laser beam is controlled. The light converged by the cylindrical lens 303 is inputted to an A/O modulator 304 and the diffracted light transmitted through the A/O modulator is converted by a cylindrical lens 305 into a beam having the original beam diameter. The light beam converted into the original beam diameter is passed through a slit 306 and then diameter-expanded or converted by a beam expander 307 into, for example, triple diameter. After conversion, the optical path of the beam is folded by a deflecting mirror 309 and a reflecting mirror 310. Then, the beam enters a diffraction grating 311. The diffraction grating 311 divides the incident light into three beams including a 0(zero)-th order diffracted beam and ±1st-order diffracted beams, which are in turn passed through an optical filter 308 for super-resolution, and then into a prism 312 for optical path multiplexing.

A laser beam from a semiconductor laser driver 378 of 685 nm wavelength, which is a recording light source, is collimated by an optical system 399 such as a coupling lens, and is thereafter passed through an optical filter 313 for super-resolution. The optical path of the light beam is then folded by an optical deflector 314 and a reflecting mirror 315. Thereafter, the beam enters a prism 316 for optical path multiplexing.

The laser beam of 532 nm wavelength and the laser beam of 685 nm wavelength are multiplexed through the prisms 312 and 316. The multiplexed beam is passed through a reflecting mirror 318 and a beam separating prism 319 and is then directed toward a moving optical system 320, which moves above an optical disk 398. In the moving optical system 320, a beam coming out of a fixed optical system is folded by a light deflecting mirror toward a surface of the optical disk 398, which is attached to a spindle motor. The folded beam is focused on the optical disk 398 by an objective lens so that light spots, such as the recording spot 101 and the reproducing spot 103 shown in FIG. 1, are formed. The moving optical system 320 is placed on a moving table which moves at a high speed in the radius direction 380 of the optical disk 398. With this construction, it is possible to perform an access operation. At the time of tracking for causing the light spot to follow the track, the moving table and the light deflecting mirror are moved in an interlocking manner.

Light reflected from the optical disk is path-bent by the beam separating prism 319 through the light deflecting mirror and is then folded by a reflecting mirror 353. The folded beam is introduced to an optical system 355 for servo signal and clock signal detection by a 685 nm separating prism 354. Also, the beam of 532 nm wavelength is transmitted through the prism 354 and is then introduced to an opto-magnetic signal detecting system 357 by a 532 nm separating prism 356.

The polarization angle of the light incident upon the opto-magnetic signal detecting system 357 is rotated by about 45 degrees by a half-wave plate 358, and three beams including s- and p-polarized lights passed through an s- and p-polarization separating prism 359 are detected by three-divisional detectors 360 and 370. The difference between outputs from the detectors corresponding to the reproducing spots 103a, 103b and 103c is produced or detected as an opto-magnetic signal 381 by a differential amplifier 371. The opto-magnetic signal 381 is input to a recording/reproducing control circuit 372 and is subjected thereby to a processing which will be described later.

In the servo signal and clock signal detecting optical system 355, marks as indicated by 104, 105 and 106 in FIG. 1 are detected. The detection signal 382 is input to a data clock generating circuit 373, a servo circuit 374 and the recording/reproducing control circuit 372, which respectively generate a clock signal, perform tracking control and automatic focusing control, and control a recording/reproducing operation which will be described later.

A signal from an encoder attached to a spindle 383 for rotating the disk is sent through a spindle driver 384 to a rotation control system 375 for synchronization thereof with a reference clock signal. Thereby, the rotation control system 375 controls the spindle 383 through the spindle driver 384 so that the spindle 383 has a fixed rotating speed. A command for control operation is given from the recording/reproducing control circuit 372 to the servo circuit 374 to control the position of the moving optical system 320. A signal for controlling the recording/reproducing power level and recording data are sent from the recording/reproducing control circuit 372 to a laser control circuit 376. The laser control circuit 376 controls the reproducing power output through the driver circuit 377 of the A/O deflector 304, which controls the output from the SHG 300. On the other hand, an APC (automatic power control) signal 385 for control of DC power, a command value 386 for setting the recording power set level, and binary recording data 387 are input from the laser control circuit 376 to a high-speed laser driver 378, which drives the recording laser 399.

Figure 16:
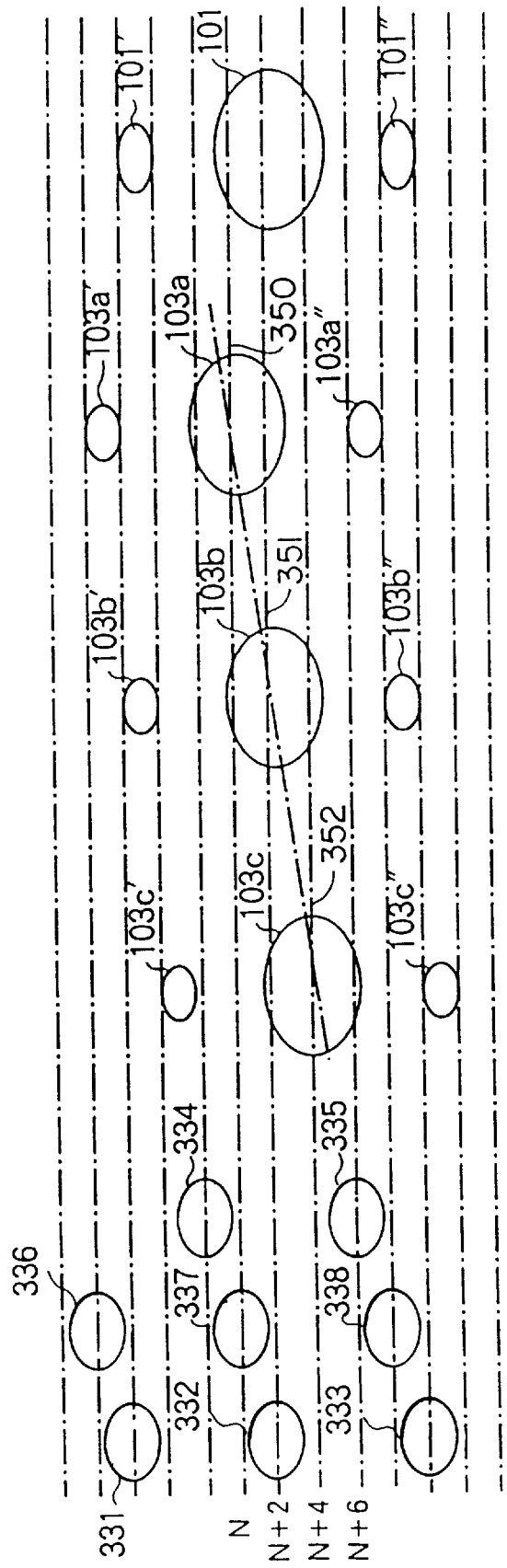
FIG. 16 is a plan view showing the arrangement of spots in the recording/reproducing system according to the present invention.

FIG. 16 shows the arrangement of light spots on the optical disk 398. A recording spot 101 of 685 nm wavelength is arranged at the head. Wobbling pits 331, 332, 333, 334 and 335 and clock pits 336, 337 and 338 formed beforehand in a concave/convex form are detected by the recording spot 101. A detection signal for tracking servo is obtained through a well-known technique from the wobbling pits offset by small amounts on the right and left sides with respect to the track center. From the clock pits is generated a clock signal which provides the base of timing for recording and reproduction of a mark to and from the disk surface.

Side lobes 101' and 101" are generated on opposite sides of the spot 101 of 685 nm wavelength through a wave front operation after passage through the optical filter for super-resolution. The optical super-resolution is caused to appear in the track radius direction and not to appear in the track circumference direction.

The reproducing laser beam of 532 nm wavelength is divided by the diffraction grating into three spots 103a, 103b and 103c, and side lobes 103a' and 103a", 103b' and 103b" or 103c' and 103c" are generated on opposite sides of each spot. The diffraction grating 311 shown in FIG. 15 is rotated in a plane perpendicular to the beam so that the three spots 103a, 103b and 103c are positioned on adjacent virtual track center lines 350, 351 and 352, respectively. The optical deflector (or light deflecting mirror) included in the moving optical system 320 is controlled by a control signal detected by the light spot 101 of 685 nm wavelength and moves the spots 103a, 103b and 103c of 532 nm wavelength simultaneously. Fine adjustment for the positioning of 532 nm and 685 nm spots is made by the deflector 314 in the 532 nm light source system shown in FIG. 15. Focusing control is made in such a manner that, using the 685 nm spot 101 as in the case of tracking error detection, a focusing error is detected in a focusing area (not shown) by use of an astigmatism system to drive the objective lens in the moving optical system.

Though a virtual track pitch must be made narrow (about 0.3 microns), the size of a spot for detecting a tracking error is 0.87 microns, or large as compared with the virtual track pitch. In the conventional system, the track pitch was on the order of the size of a spot. Thus, pre-pits for sample servo in the conventional system are used to generate a control signal which enables a finer positioning than the track pitch. Herein, the interval between pre-pits and the interval between wobbling pits are 1.2 microns and 0.3 microns, respectively.

FIGS. 17A–17E explain a method of forming a tracking error signal. A clock signal for making the timing is generated from a signal detected from a clock mark. Sample/hold signals A, B and C (1702, 1703 and 1704) for detecting the signal levels of a wobbling mark A 333, a clock mark 338 and a wobbling mark B 335, are generated using the clock signal. The level of a total light amount signal Sa 1701 from each mark is sampled and held by the sample/hold signals A, B and C.

Figure 18:
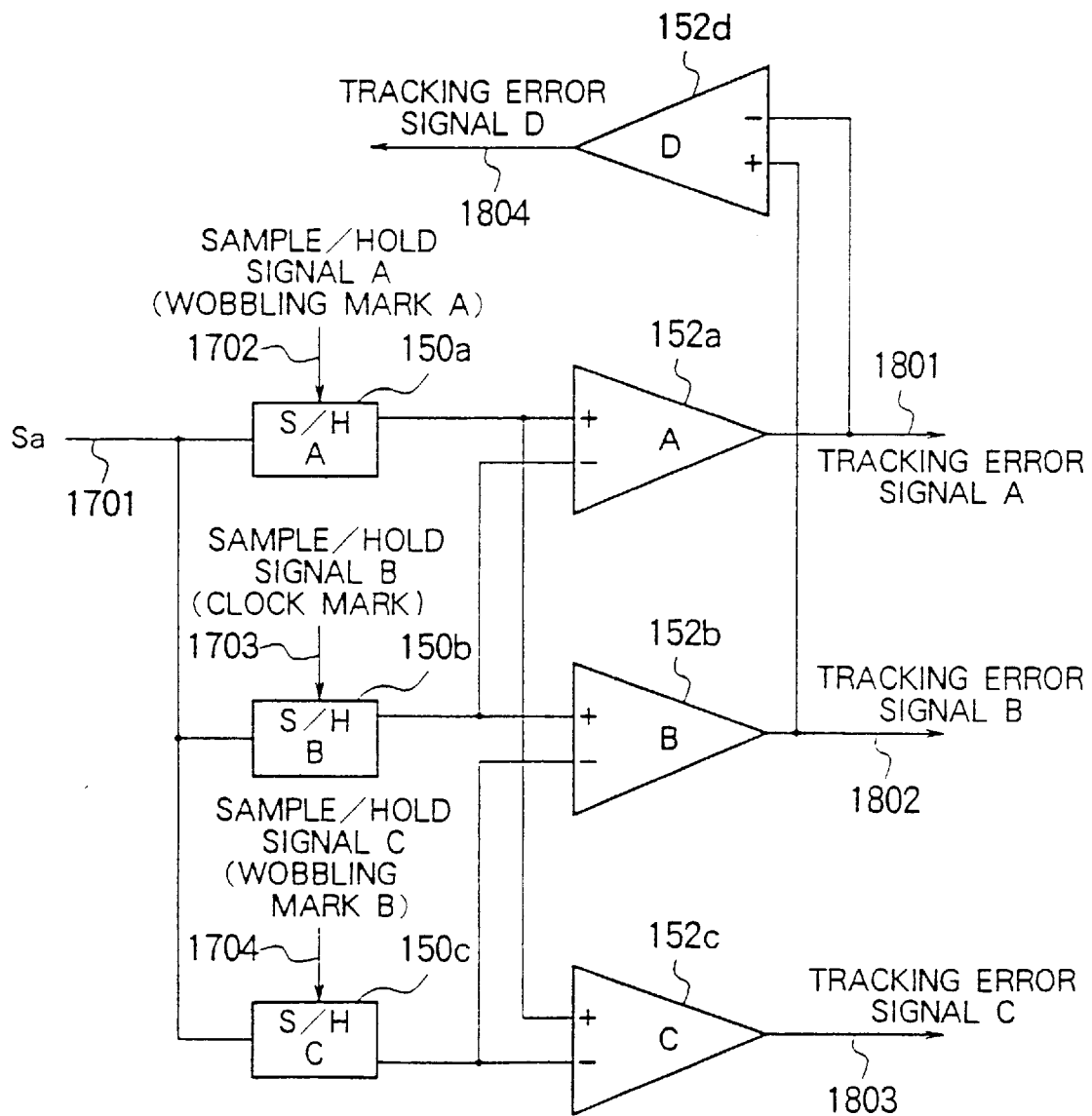
FIG. 18 is a block diagram for explaining an operational circuit for detecting a tracking error signal in the present invention.

FIG. 18 shows a specific construction of the servo circuit 373 for forming the tracking error signal. Sample/hold circuits 150a, 150b and 150c sample and hold a total light amount signal modulated by the wobbling mark A 333, the clock mark 338 and the wobbling mark B 335, respectively. Subtraction circuits 152a, 152b and 152c produce differences between the sampled and held signals to generate tracking signals A (1801), B (1802), C (1803) and D (1804). These signals serve as control signals for positioning a light spot at virtual track center lines N, N+1, N+2 and N+7 obtained by equally dividing the track pitch into eight parts, as shown in FIG. 16.

Figure 19:
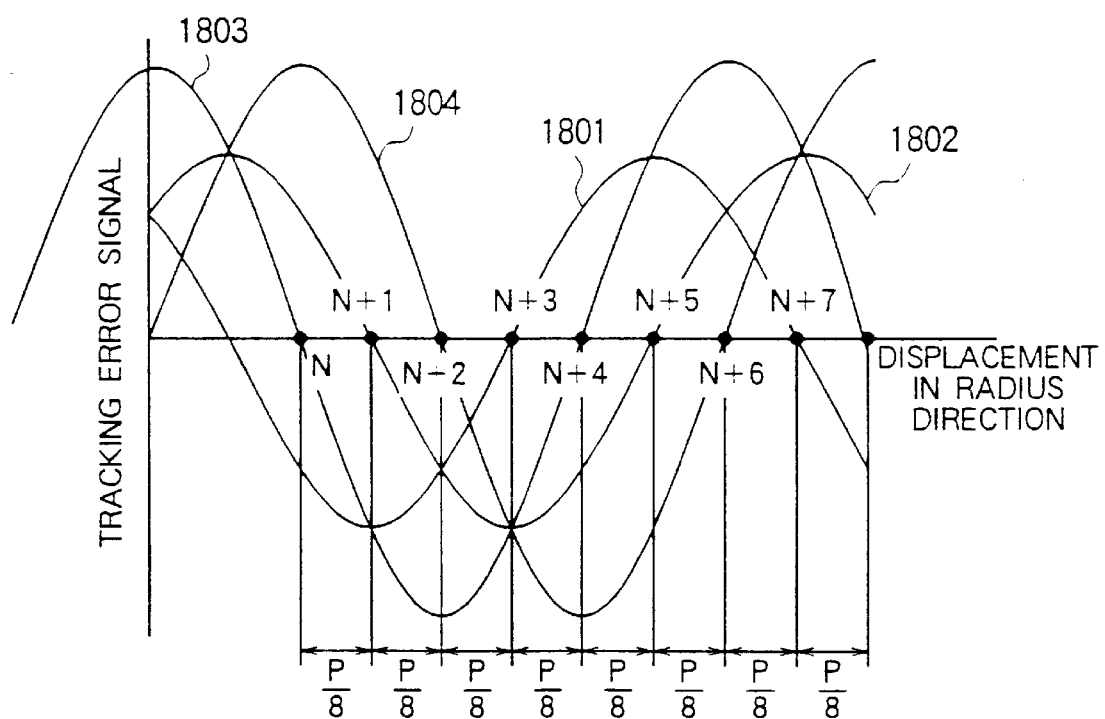
FIG. 19 is a graph for explaining tracking error signals detected in accordance with the present invention.

FIG. 19 shows the relationship between the virtual track center lines shown in FIG. 16 and the tracking signals 1801, 1802, 1803 and 1804. With the use of this relationship, tracking control becomes possible.

Figure 20:
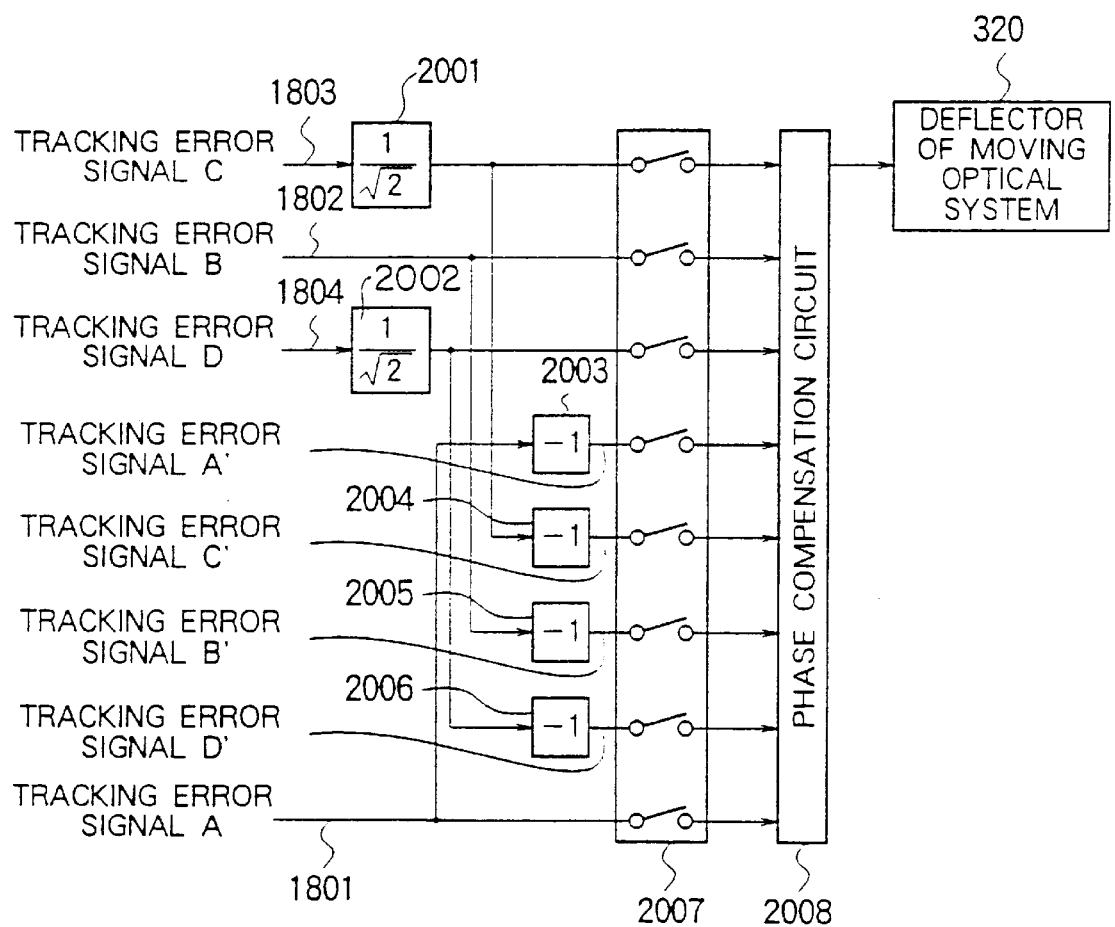
FIG. 20 is a circuit diagram of a control circuit using the tracking error signals detected in accordance with the present invention.

FIG. 20 shows a specific example of a control signal forming circuit. The amplitudes of the tracking signals C (1803) and D (1804) are adjusted by gain control circuits 2001 and 2002. Also, tracking signals A', B', C' and D' are generated through polarity adjustment by polarity inverting circuits 2003, 2004, 2005 and 2006. These signals are changed over by a change-over circuit 2007 and are processed by a phase compensation circuit 2008. The output of the phase compensation circuit 2008 is input as a control signal for a control system to control the optical deflector in the moving optical system 320.

Figure 21:
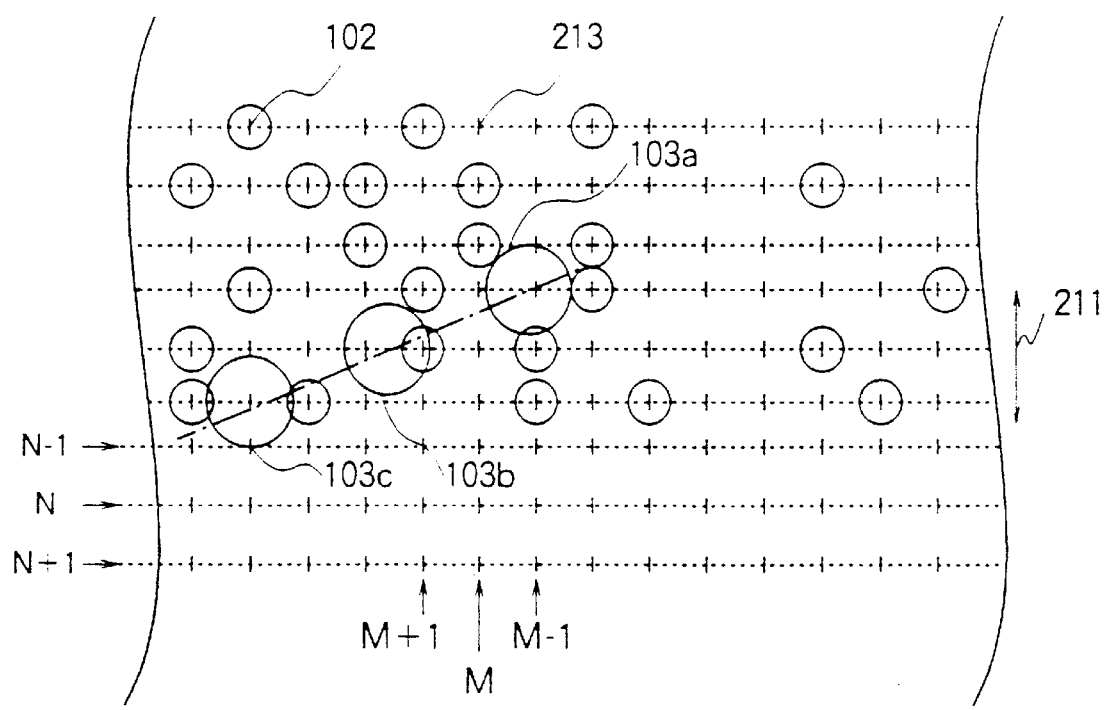
FIG. 21 is a plan view for explaining a track layout in a recording method according to the present invention.

FIG. 21 shows an example of a recording system according to the present invention in which an information block to be subjected to reproduction is composed of three information tracks. Information to be recorded is recorded as an information block 211 including the assembly of three rows of information marks 102. The information block has the concept of a sector in the conventional system and is composed of, for example, an address region, a timing region, an interference factor learning region and a data storage region, in order from the head. Marks (inclusive of pre-pits) included in these regions are formed on lattice points 213 which are defined beforehand at a predetermined period from the head position of the sector. Information marks on the three information tracks are reproduced by three reproducing spots 103a, 103b and 103c.

The situation of FIG. 21 is shown as a perspective view in FIG. 1. In the address region, a specified pattern indicating the head of a sector, a sector address or the like is formed beforehand as pre-pits 106. In the timing region, a timing mark 104 is formed beforehand at a position on the lattice point 213 on each information mark row. A strobe pulse signal, which is used when an information mark is recorded on the lattice point or a signal on the lattice point is sampled, is generated or corrected on the basis of a detection signal from the timing mark and by use of a PLL circuit. In the interference factor learning region which will be mentioned later on, there is formed a learning mark for learning an interference factor required for a signal processing operation at the time of information reproduction.

FIG. 21 shows a portion corresponding to the data storage region. An information mark 102 to be recorded is recorded on the lattice point 213. More particularly, the information mark 102 is recorded in accordance with instants of time - - - , $t_{i-1}, t_i, t_{i+1}$ - - - corresponding to predetermined intervals by use of the strobe pulse signal generated on the basis of the timing mark. Accordingly, information is represented by whether or not the information mark 102 exists on the lattice point 213 to be subjected to recording.

Figure 22:
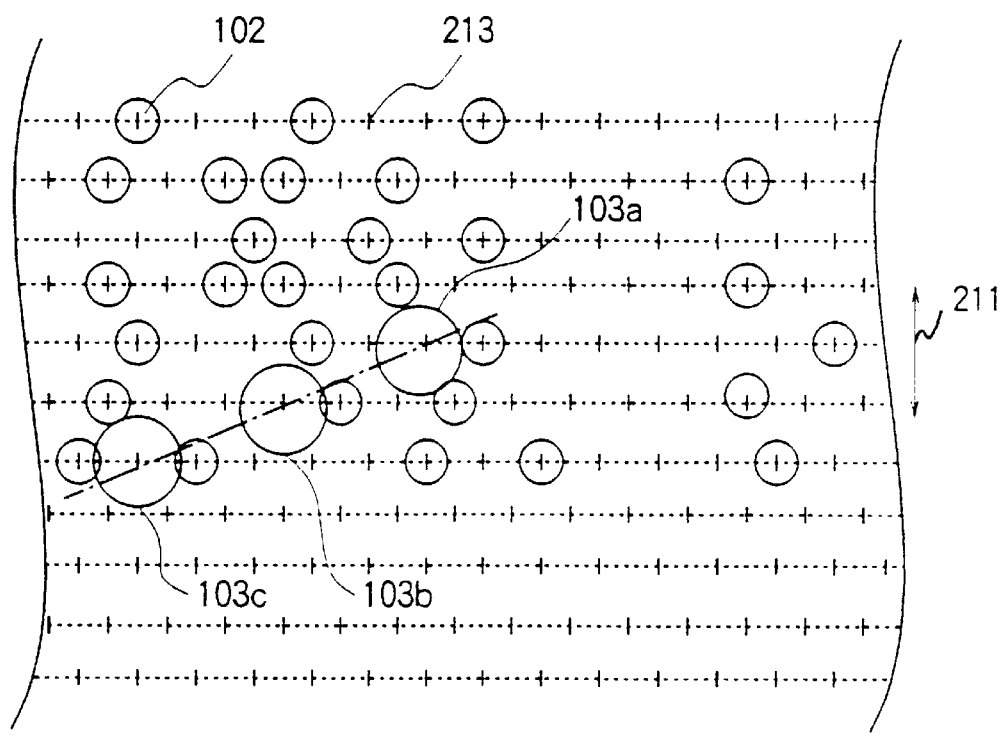
FIG. 22 is a plan view for explaining another track layout in the recording method according to the present invention.

FIG. 22 shows another example of the recording system. In the example shown in FIG. 21, the lattice points 213 are aligned in the radius direction of the optical disk and in the circumference direction thereof. On the other hand, in the example shown in FIG. 22, lattice points on adjacent information tracks are shifted by a half period. Crosstalk on each lattice point in the disk radius direction in this case becomes smaller than that in the case of FIG. 21. Therefore, the interval between lattice points can be narrowed further in the same disk radius direction as compared with the example of the recording system shown in FIG. 21, thereby attaining a still higher density in the disk radius direction.

Figure 23:
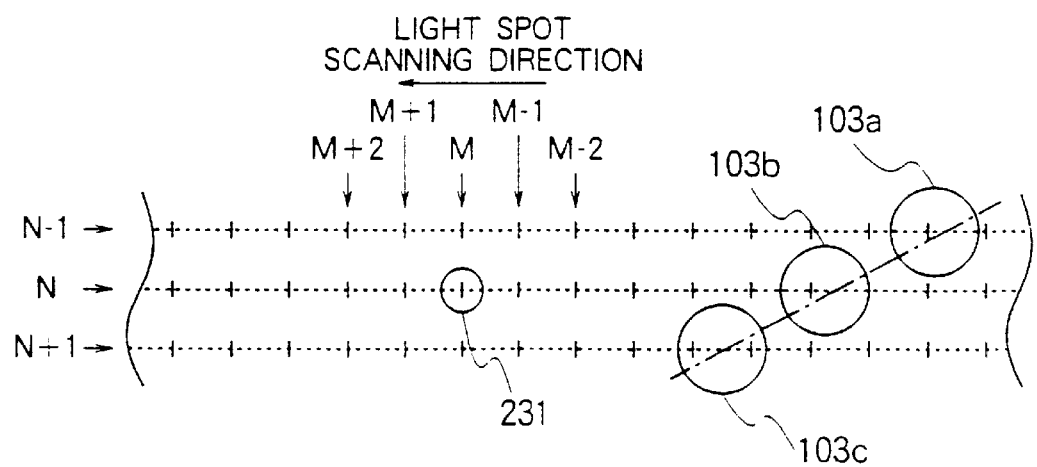
FIG. 23 is a plan view for explaining the learning of interference factors for reproduction in the present invention.

FIG. 23 shows an example of the above-mentioned learning mark. A learning mark 231 may be recorded as an isolated mark positioned on the lattice point of a middle one of three information tracks. The learning mark 231 can be formed beforehand as a pre-pit or at the time of disk delivery.

At the time of information reproduction, an interference factor is first learned. The interference factor, which is a function of a light spot form, an information mark form and a lattice point interval, must be learned by the actual optical disk device. Therefore, the learning mark 231 is detected by a light spot at the time of information reproduction, thereby learning the interference factor.

Figure 33:
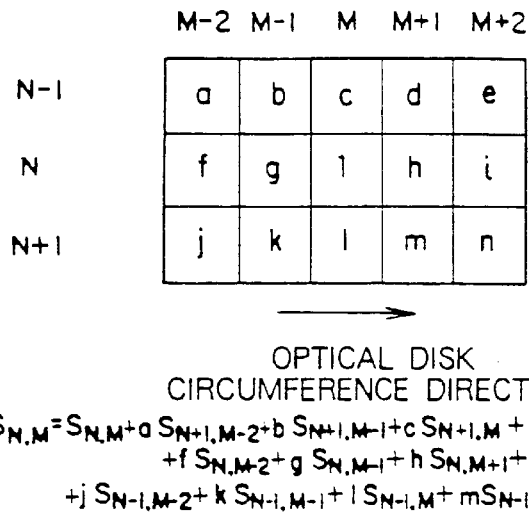
FIG. 33 is a diagram for explaining interference factors.

In the case where the information block to be subjected to reproduction is composed of three information tracks, the interference factor has a characteristic such as a to n shown in FIG. 33.

First, when the center of a light spot 103c reaches a lattice point (M−2, N+1), q(j) is measured as the amount of interference in the diagonal direction. When the center of the light spot 103c reaches a lattice point (M−1, N+1), q(k) is measured as the amount of interference in the diagonal direction. When the center of the light spot 103c reaches a lattice point (M, N+1), q(l) is measured as the amount of interference in the radius direction. Next, when the center of a light spot 103b reaches a lattice point (M−2, N), q(f) is measured as the amount of interference in the circumference direction. When the center of the light spot 103b reaches a lattice point (M−1, N), q(g) is measured as the amount of interference in the circumference direction. When the center of the light spot 103b reaches a lattice point (M, N), an isolated signal $S_{M,N}$ of the interference factor learning mark 231 is detected.

On the basis of the above measured values, an interference factor j in the diagonal direction is given by the ratio $q(j)/S_{M,N}$ of the amount of interference q(j) in the diagonal direction to the isolated signal $S_{M,N}$. Similarly, an interference factor l in the radius direction is given by the ratio $q(l)/S_{M,N}$ of the amount of interference q(l) in the radius direction to the isolated signal $S_{M,N}$, and an interference factor f in the circumference direction is given by the ratio $q(f)/S_{M,N}$ of the amount of interference q(f) in the circumference direction to the isolated signal $S_{M,N}$.

Similarly, interference factors m and n in the diagonal direction can be detected when the center of the light spot 103c reaches a lattice point (M+1, N+1) and when the center of the light spot 103c reaches a lattice point (M+2, N+1). Also, interference factors d and e in the diagonal direction can be detected when the center of the light spot 103a reaches a lattice point (M+1, N−1) and when the center of the light spot 103a reaches a lattice point (M+2, N−1). Further, an interference factor h or i in the circumference direction is obtained by determining the ratio of the amount of interference q(h) or q(i) (which is obtained when the light spot 103b reaches a lattice point (M+1, N) or (M+2, N)) to the isolated signal $S_{M,N}$. Also, the learning precision of the interference factor can be improved by performing the above-mentioned learning plural times and averaging the results of learning. In one example of a method for attaining that purpose, a plurality of interference factor learning marks are provided.

A signal processing operation for reducing crosstalk noise components is performed using each interference factor obtained by the above-mentioned means and a detection signal sampled at each lattice point position by the above-mentioned strobe pulse signal. At this time, if a strobe pulse signal timing-corrected by the PLL circuit is used, the information mark detection signal at the lattice point position can be sampled more accurately.

In the case of the information mark row as shown in FIG. 21, there are used a detection signal on the lattice point (M, N) and detection signals on 14 (5×3−1=14) lattice points adjacent to the lattice point (M, N). These signals are shown in FIG. 33.

Figure 40:
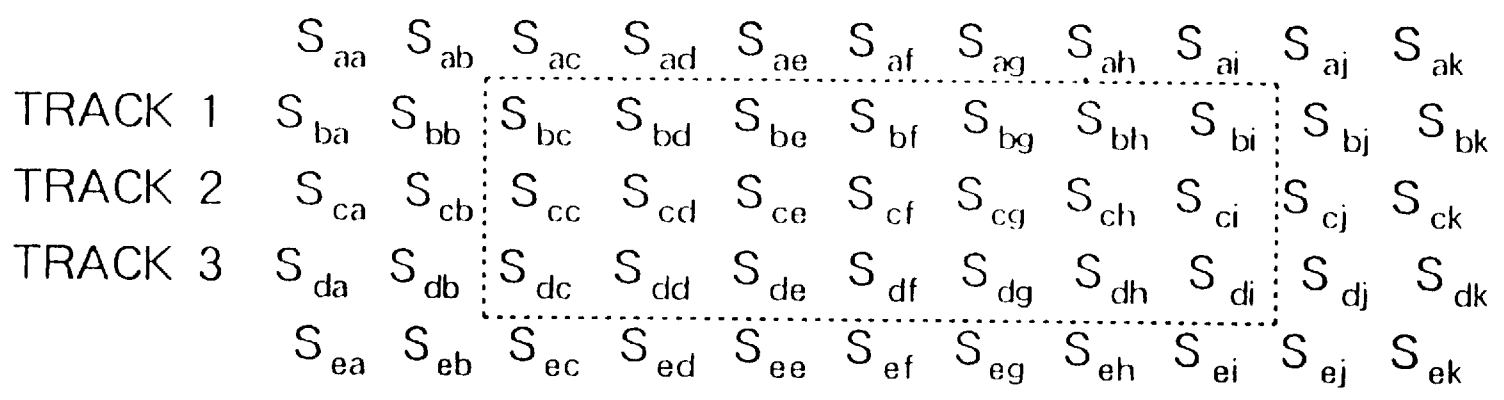

FIG. 40 shows a matrix of signal amplitudes at lattice points, on three tracks 1, 2 and 3 and two tracks adjacent thereto, when only a recorded mark exists in an isolated form. What can be detected simultaneously in the present embodiment corresponds to only three tracks. Therefore, the accurate detection of a mark in an area enclosed by a dotted line in FIG. 40 will be considered in the following. It is now assumed that the value of operation obtained ignoring E in the following operation expression (2) representing an isolated signal obtained at each lattice point is a value to be determined in which crosstalk is reduced:

$$S'(i,j) = K(i,j)S(i,j) + E \qquad (2)$$

where S(j, k) is a column vector, the components of which are the isolated signals obtained at 21 lattice point positions; and E is a column vector representing crosstalk from lattice points other than the 21 lattice points. If the influence of crosstalk is completely eliminated, the isolated signal S(i, j) at each lattice point can be determined using the following equation (3):

$$S(i,j) = K^{-1}(i,j)\,(S'(i,j)-E) \qquad (3)$$

However, the column vector E involves portions which cannot be detected by three spots. Therefore, the value of operation obtained ignoring E is calculated. Namely, a signal S" at a lattice point (i, j) is determined from the detection signal by use of the inverse matrix of K as shown by the following equation (4):

$$S''(i,j) = K^{-1}(i,j)S'(i,j) \quad (4)$$

$$E = \begin{bmatrix} aS_{aa} + bS_{ab} + cS_{ac} + dS_{ad} + eS_{ae} + S_{ba} + gS_{bb} + jS_{ca} + kS_{cb} \\ aS_{ab} + bS_{ac} + cS_{ad} + dS_{ae} + eS_{af} + fS_{bb} + gS_{bb} + jS_{cb} \\ aS_{ac} + bS_{ad} + cS_{ae} + dS_{af} + eS_{ag} \\ aS_{ad} + bS_{ae} + cS_{af} + dS_{ag} + eS_{ah} \\ aS_{ae} + bS_{af} + cS_{ag} + dS_{ah} + eS_{ai} \\ aS_{af} + bS_{ag} + cS_{ah} + dS_{ai} + eS_{aj} + iS_{bj} + nS_{cj} \\ aS_{ag} + bS_{ah} + cS_{ai} + dS_{aj} + eS_{ak} + hS_{bj} + mS_{cj} + nS_{ck} \\ \hline aS_{ba} + bS_{bb} + fS_{ca} + gS_{cb} + jS_{da} + kS_{db} \\ aS_{bb} + fS_{cb} + jS_{db} \\ 0 \\ 0 \\ 0 \\ eS_{bj} + iS_{cj} + nS_{dj} \\ dS_{bj} + eS_{bk} + hS_{cj} + iS_{ck} + mS_{dj} + nS_{dk} \\ \hline aS_{ca} + bS_{cb} + fS_{da} + gS_{db} + jS_{ec} + kS_{eb} + lS_{ec} + mS_{ed} + nS_{ee} \\ aS_{cb} + fS_{db} + jS_{eb} + kS_{ec} + lS_{ed} + mS_{ee} + nS_{ef} \\ jS_{ec} + kS_{ed} + lS_{ee} + mS_{ef} + nS_{eg} \\ jS_{ed} + kS_{ee} + lS_{ef} + mS_{eg} + nS_{eh} \\ jS_{ee} + kS_{ef} + lS_{eg} + mS_{eh} + nS_{ei} \\ eS_{cj} + iS_{dj} + jS_{ef} + kS_{eg} + lS_{eh} + mS_{ei} + nS_{ej} \\ dS_{cj} + eS_{ck} + hS_{dj} + iS_{dk} + jS_{eg} + kS_{eh} + lS_{ei} + mS_{ej} + nS_{ek} \end{bmatrix}$$

As is apparent from the foregoing, the use of the recording method and the signal processing operation method in the present invention makes it possible to realize recording/ reproduction with a higher density than that of the conventional system. Also, since crosstalk noise components are sufficiently reduced in reproduction signals from all light spots which are used at the time of information reproduction, the data transfer rate is improved as compared with the conventional system.

In the following, a recording system for realizing the above-described information recording method and signal processing operation will be described, taking by way of example the case where an information block is composed of three information tracks.

An optical system for realizing the above-mentioned plural light spots and the tracking and focusing of the plural light spots may be realized using means disclosed by, for example, JP-B-58-021336. At this time, an axis connecting the plurality of light spots has an inclination relative to the radius direction of the information block, as shown in FIG. 21. As a result, a fixed time difference in the optical disk circumference direction is generated between the light spots. In the case where the time difference is not a multiple of the lattice point interval, it is necessary to prepare specific strobe pulse signals for a plurality of light spots 103a to 103c, respectively, in order that information marks 102 are simultaneously recorded on and reproduced from lattice points 213 by use of the plurality of light spots 103a to 103c. Namely, the pulses of each strobe pulse signal are accurately synchronized with lattice points on the corresponding information track so that each light spot makes the recording and reproduction of information in accordance with the timing of the synchronized strobe pulse. At this time, the time difference between the strobe pulse signals corresponds to the above-mentioned time difference between the light spots.

Figure 24:
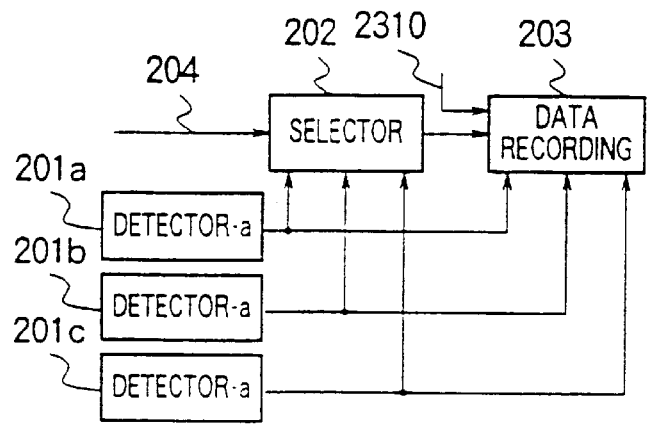
FIG. 24 is a schematic block diagram of a data recording circuit in the present invention.

FIG. 24 shows a block diagram of a recording circuit for performing the above-mentioned recording. The recording circuit includes detector sections 201a to 201c which detect the entering of each light spot into a learning region, the number of which is equal to the number of light spots; a data selector section 202 which selects learning data and information data; and a data recording section 203 which is controlled by a clock signal 2310.

Figure 25:
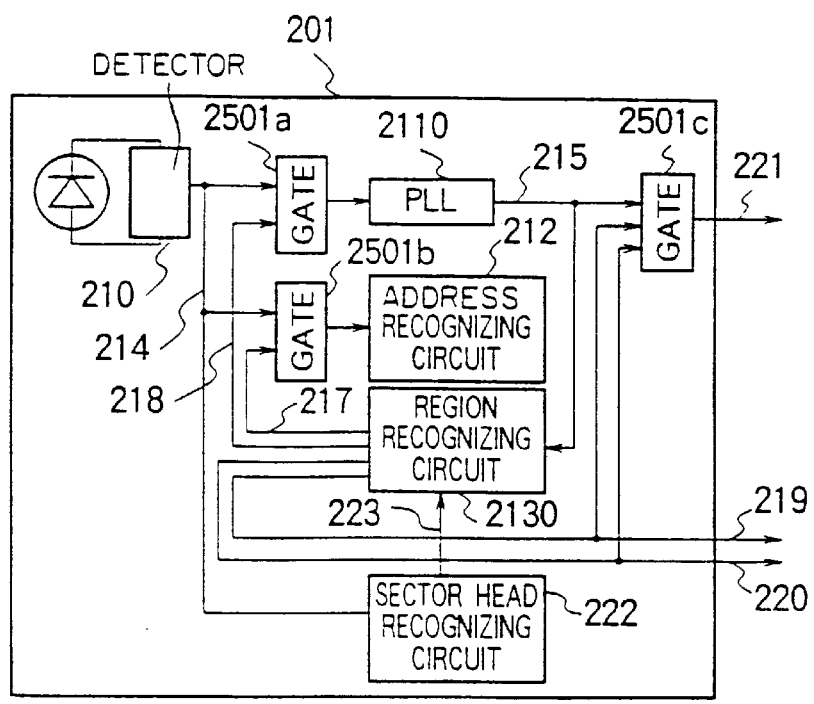
FIG. 25 is a block diagram for explaining a data detector section in the present invention.

FIG. 25 shows an example of the detector section 201 shown in FIG. 24. Corresponding to each light spot, a detector 210 detects marks on the optical disk. Predetermined timing signals are extracted by gates 2501a and 2501b from a detection signal received from the detector 210. A PLL circuit 2110 generates a timing signal from a signal output from the gate 2501a corresponding to the timing mark. A sector head recognizing circuit 222 recognizes the head of a sector from a signal output from the detector 210 corresponding to a header mark recorded at the head of a region. A region recognizing circuit 2130 controls the detector section 201.

Figure 32:
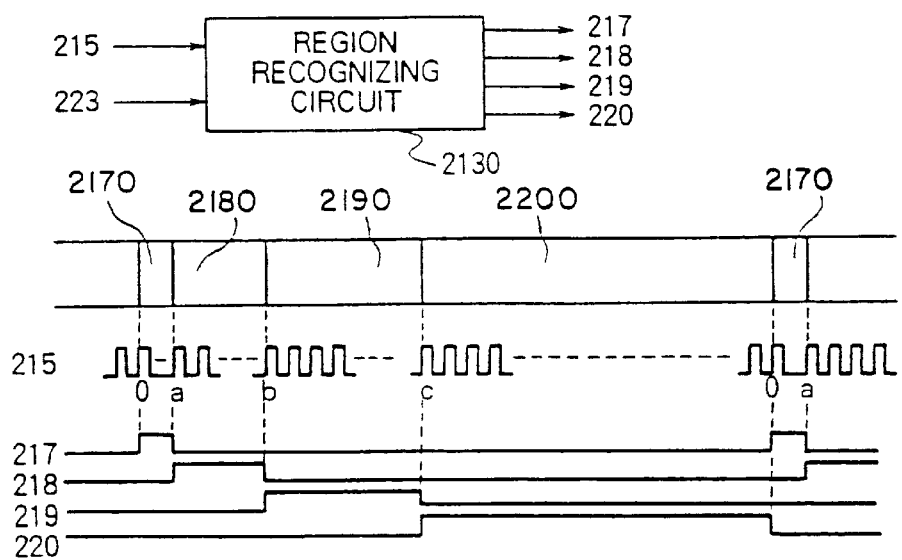
FIG. 32 is a diagram for explaining a region recognizing circuit in the present invention.

The operation of the detector section 201 will now be explained referring to a time chart shown in FIG. 32. The region recognizing circuit 2130 counts strobe pulses 215 outputted from the PLL circuit 2110 to recognize the position of a light spot, thereby outputting an address region signal 217, a timing region signal 218, an interference factor learning region signal 219 and a data storage region signal 220.

More particularly, the count value of the strobe pulses 215 is first reset to 0 by a pulse signal 223 output from the sector head recognizing circuit 222. The sector head recognizing circuit 222 detects, on the basis of an output signal 214 from the optical detector 210, a specified pattern which is formed in an address region 2170 and indicates the head of a sector. When detecting the specified pattern, the sector head recognizing circuit 222 outputs the pulse signal 223.

During a time when the count value is between 0 and a, the light spot exists in the address region 2170 and hence the region recognizing circuit 2130 outputs only the address region signal 217 as a turned-on signal. When the address region signal 217 is turned on, the output signal 214 from the optical detector 210 is output through the gate circuit 2501b to the address recognizing circuit 212. The address recognizing circuit 212 detects address information formed in the address region 2170 on the basis of the output signal of the gate 2501b.

During a time when the count value is between a and b, the light spot exists in a timing region 2180 and hence the region recognizing circuit 2130 outputs only the timing region signal 218 as a turned-on signal. When the timing region signal 218 is turned on, the output signal 214 from the optical detector 210 is outputted through the gate circuit 2501a to the PLL circuit 2110. The PLL circuit 2110 detects a timing mark formed in the timing region 2180 on the basis of the output signal 214 from the optical detector 210 and corrects the deviation of timing between the strobe pulse and the lattice point position by use of the result of detection. The PLL circuit 211 outputs strobe pulses 215. The strobe pulses 215 are outputted through a gate circuit 2501c from the detector section 201 when the interference factor learning region signal 219 is in a turned-on condition or when the data storage region signal 220 is in a turned-on condition.

During a time when the count value is between b and c, the light spot exists in an interference factor learning region 2190 and hence the region recognizing circuit 2130 outputs only the interference factor learning region signal 219 as a turned-on signal. During a time when the count value is between c and d, the light spot exists in a data storage region 2200 and hence the region recognizing circuit 2130 outputs only the data storage region signal 220 as a turned-on signal. The interference factor learning region signal 219 and the data storage region signal 210 provide output signals of the detector section 201. Accordingly, the detector sections 201a to 201c output the strobe pulses 215a to 215c, the interference factor region signals 219a to 219c and the data storage region signals 220a to 220c.

Figure 26:
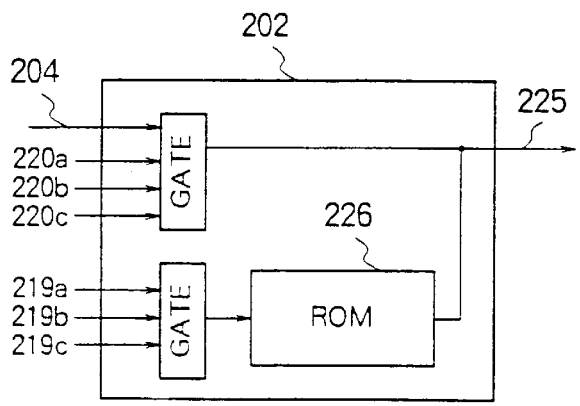
FIG. 26 is a block diagram for explaining a data selector section in the present invention.

FIG. 26 is a block diagram showing an example of the data selector section 202. The data selector section 202 is input with user data 204, and a plurality of data storage region signals 220a to 220c and a plurality of interference factor region signals 219a to 219c, which are outputted from the detector sections 201a to 201c. For example, when at least one of the data storage region signals 220a to 220c is turned on, the data selector section 202 outputs the user data 204 as serial data 225. When at least one of the interference factor region signals 219a to 219c is turned on, the data selector section 202 outputs a data string stored in an interference factor learning data ROM 226 as serial data 225 in order that information marks necessary for learning interference factors are recorded in the interference factor learning region 2190. In this case, the data string may represent an isolated mark as shown in FIG. 23.

Figure 27:
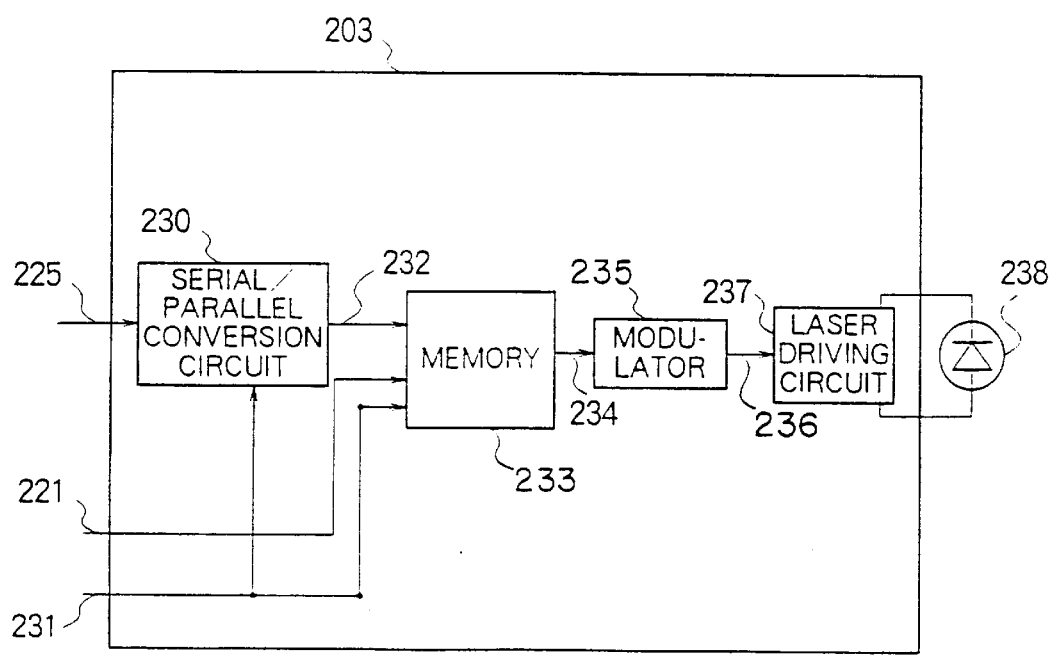
FIG. 27 is a block diagram for explaining an embodiment of a data recording section in the present invention.

FIG. 27 shows an example of the data recording section 203. The data recording section 203 is input with the data recording strobe pulse signal 221 and the serial data 2125 mentioned above. At this time, the serial data 225 is converted by a serial/parallel conversion circuit 230 which operates by a reference clock signal 231 having a higher frequency than the recording strobe pulse signal 221. The converted data 232 is stored into an FI/FO (first-in/first-out) memory 233 and the stored data is read from the FI/FO memory 233 by the recording strobe pulse signal 221. The read data 234 is input to a modulator 235. The modulated data 236 is input to a laser driving circuit 237 so that marks are recorded by an intensity-modulated light spot 238.

In the case where the recording to the three-track information block 211 shown in FIG. 21 is to be made by one spot 101 shown in FIG. 1, the recording to the three information tracks is made by carrying out the recording to one information track for each rotation of the disk by use of the above circuit. Also, a 3-beam laser array of 685 nm wavelength can be used as a light source in such a manner that recording spots are respectively positioned on the three information tracks in the information block, and the FI/FO memory 233, the modulator 235 and the laser driving circuit 237 shown in FIG. 27 are provided in a three-system form. Further, the recording/reproduction by three beams can be made by providing three SHG lasers of 532 nm wavelength in place of the laser of 685 nm wavelengths and by using three systems of A/0 modulators.

Figure 28:
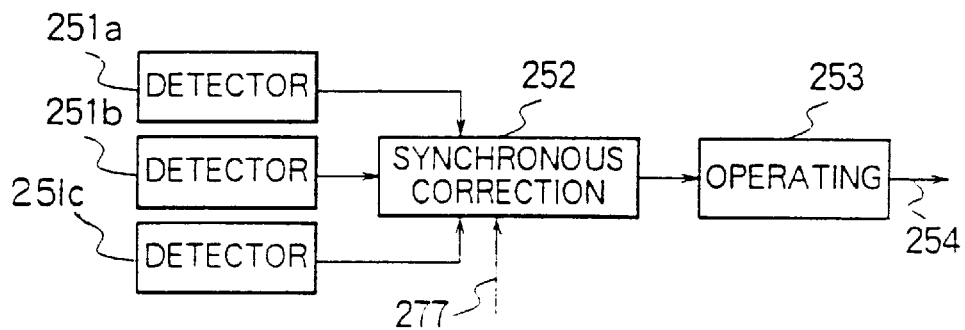
FIG. 28 is a schematic block diagram of a data reproducing circuit in the present invention.

FIG. 28 shows a block diagram of an information reproducing circuit for reproducing the recorded information. The reproducing circuit includes detector sections 251a to 251c which detect the entering of each light spot into each region shown in FIG. 32 and the number of which is equal to the number of light spots, a synchronous correction section 252 for synchronizing the detection signals from the respective detector sections with each other, and an operating section 253.

Figure 29:
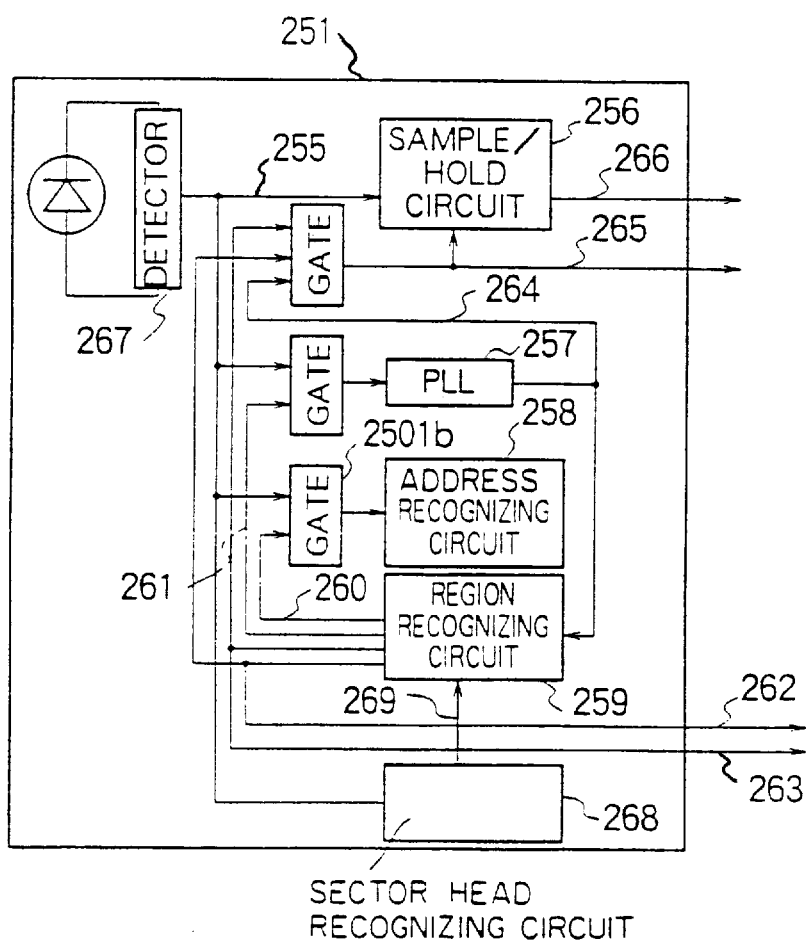
FIG. 29 is a block diagram for explaining a detector section in data reproduction according to the present invention.

FIG. 29 is a block diagram showing an example of a detector section 251. The detector section 251 corresponding to each light spot is mainly composed of a detector 267, a sample/hold circuit 256, a PLL circuit 257, an address recognizing circuit 258 and a region recognizing circuit 259. The PLL circuit 257, the sector head recognizing circuit 258, the region recognizing circuit 259 and a sector head recognizing circuit 268 are the same as those in the above-described recording circuit. The detector section 251 is controlled by the region recognizing circuit 259 as in the detector section 201 of the recording circuit. First, when a light spot enters a timing region, a timing region signal 261 output from the region recognizing circuit 259 is turned on so that a timing mark signal detected by the light spot is input to the PLL circuit 257 included in the detector section 251. On the basis of the timing mark signal, the PLL circuit 257 corrects the phase shift of a strobe pulse signal 264 caused by the non-uniformity of the rotation of the disk or the like. When an interference factor learning region signal 262 is in a turned-on condition or when a data storage region signal 263 is in a turned-on condition, the output of the PLL circuit 257 or the strobe pulse signal 264 turns to a clock signal 265 for the sample/hold circuit 256. The sample/hold circuit 256 samples the value of an input or detection signal 255 on a lattice point in accordance with the clock signal 265. The sampled value turns to an output of the detector section 251 as a detection signal 266. The detection signal 266 is input to the synchronous correction section 252.

Only when the interference factor learning region signal 262 is in a turned-on condition or when the data storage region signal 263 is in a turned-on condition, an output from the sample/hold circuit 256 to generate pulses corresponding to lattice points turns to an output of the detector section 251 as the control clock signal 265. The signal 265 is input to the synchronous correction section 252.

Figure 30:
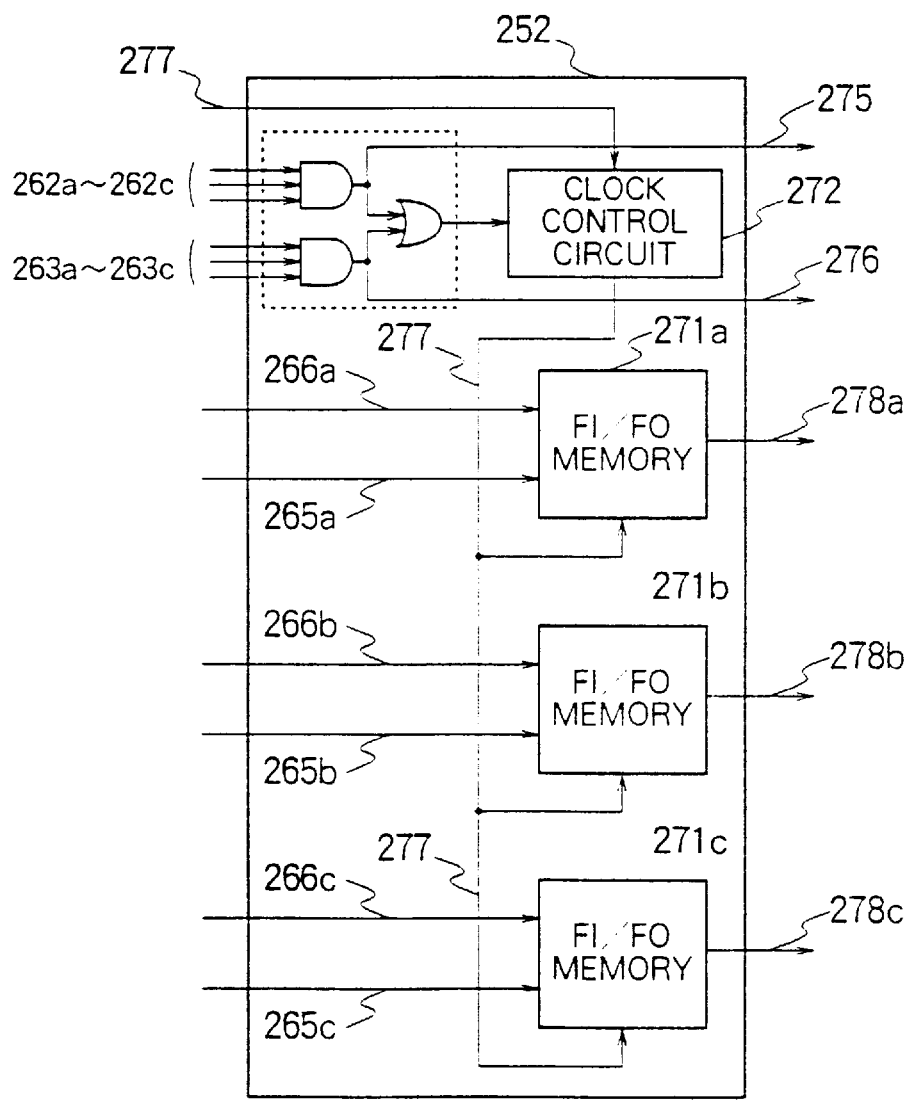
FIG. 30 is a block diagram for explaining a synchronous correction section in recording/reproduction in the present invention.

FIG. 30 is a block diagram showing an example of the synchronous correction section 252. The synchronous correction section 252 is mainly composed of FI/FO memories 271a to 271c and a read clock control circuit 272. Detection signals 266a to 266c output from the detector sections 251a to 251c and input to the synchronous correction section 252 are stored into the FI/FO memories 271a to 271c in accordance with the control clock signals 265a to 265c output from the detector sections 251a to 251c and input to the synchronous correction section 252. When either an interference factor region signal 275 (turned on when interference factor learning region signals 262a to 262c output from the detector sections 251a to 251c are all in turned-on conditions) or a data storage region signal 276 (turned on when data storage region signals 263a to 263c output from the detector sections 251a to 251c are all in turned-on conditions) is turned on, the read clock control circuit 272 outputs a reference clock signal 277. The frequency of the reference clock signal 277 is selected to be equal to or lower than the frequency of the control clock signals 265a to 265c.

The detection signals stored in the FI/FO memories 271a to 271c are read in accordance with the output signal 277 of the read clock control circuit 272, and the read signals turn to the output of the synchronous correction section 252 as synchronized detection signals 278a to 278c and they are input to the operating section 253. Also, the interference factor learning region signal 275 and the data storage region signal 276 turn to the output of the synchronous correction section 252 and are input to the operating section 253.

Figure 31:
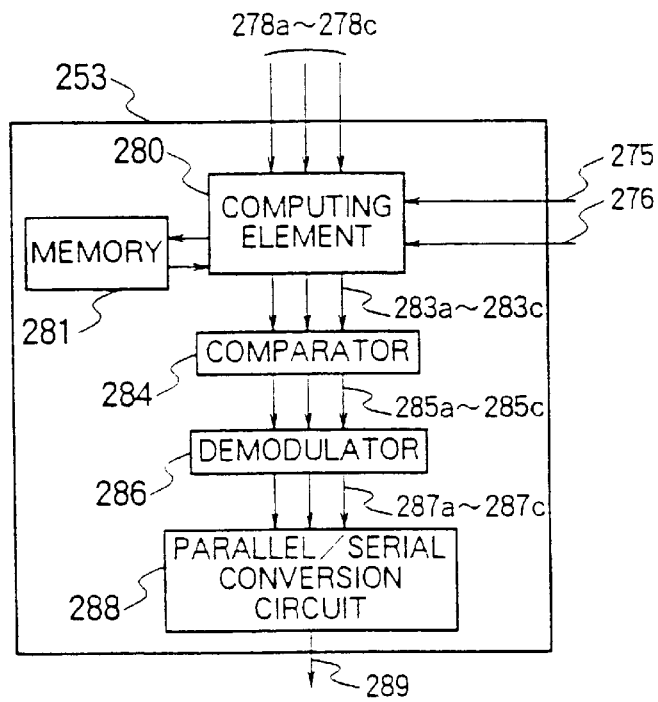
FIG. 31 is a block diagram for explaining the processing of a reproduction signal in the present invention.

FIG. 31 shows an example of the operating section 253. The detection signals 278a to 278c output from the synchronous correction section 252 and input to the operating section 253 are input to a computing element 280. In the case where the interference factor learning region signal 276 is in a turned-on condition, the computing element 280 makes the above-mentioned calculation on the basis of the detection signals 278a to 278c to determine interference factors and calculates an inverse matrix on the determined interference factors (see equation (4)) to determine an operation factor. The determined operation factor is stored into an operation factor memory 281.

In the case where the data storage region signal 276 input from the synchronous correction section 252 is in a turned-on condition, the computing element 280 performs operations represented by equations (2), (3) and (4) on the basis of the detection signals 278a to 278c and the operation factor determined by the above-mentioned means. The results of operation 283a to 283c with reduced crosstalk noise are output to a comparator 284. The comparator 284 judges the presence/absence of an information mark on the basis of the value of the operation results 283a to 283c. The results 285a to 285c of judgment are demodulated by a demodulator 286 and are then output therefrom as reproduction signals 287a to 287c.

Further, serial data 289 (that is, user data) are reproduced by a parallel/serial conversion circuit 288.

Though the foregoing is an example of simultaneous reproduction for three tracks in which information of one information block constituted by a set of three information tracks is simultaneously reproduced, it is also possible to make the recording/reproduction for only one track scanned by the middle reproducing spot 103b.

In such a system, the reproduction for only a track scanned by the spot 103b suffices. The spots 103a and 103c are used for detecting the signal leakage into the information track irradiated with the spot 103b from information tracks adjacent thereto. By canceling the leakage of signals detected by the spots 103a and 103c (or the crosstalk) from a signal detected by the spot 103b, accurate information can be detected even if an interval between information blocks shown in FIG. 21 is made narrow. Accordingly, the recording density can be made still higher. The construction for the recording is similar to the construction shown in FIG. 1. The recording is made by a recording spot 101 of 685 nm wavelength, and the data on the information track irradiated with a spot 103b is reproduced using three spots 103a, 103b and 103c of 532 nm wavelength.

More particularly, in calculation with the present surface density, the spot size W comes to 0.96 microns when the reproducing wavelength is 530 nm and the numerical aperture is 0.55. With optical super-resolution, the spot size in the track direction effectively comes to 0.7 times or 0.67 microns. In the present reproducing system, the track pitch can be reduced to 0.4 times as large as W. As a result, a track pitch of 0.3 microns can be realized.

When the optical super-resolution is made, side lobes are generated on the disk surface and there is a signal leakage from the tracks which the side lobes span. In order to prevent the leakage signal from being detected on the detector surface, a shielding plate for cutting off the side lobes is commonly inserted in the course of a light beam after the passage thereof through the objective lens. In the present system, however, since at least three beams are involved and the beams are arranged with an inclination from the track direction, the setting by the same shielding plate is difficult.

Figure 35:
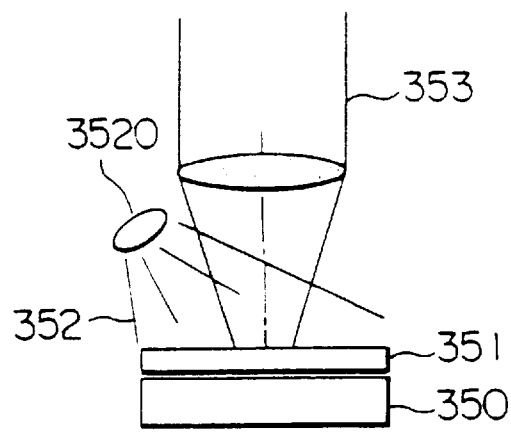
FIG. 35 is a view showing the construction of an optical detector of the present invention.

An example of an optical detector that solves the above problem of side lobes is shown in FIG. 35. The optical detector 350 is coated with a non-linear transmissive material 351. The non-linear material may be, for example, a diaryl ethene derivative which is a photochromic medium.

Figure 34:
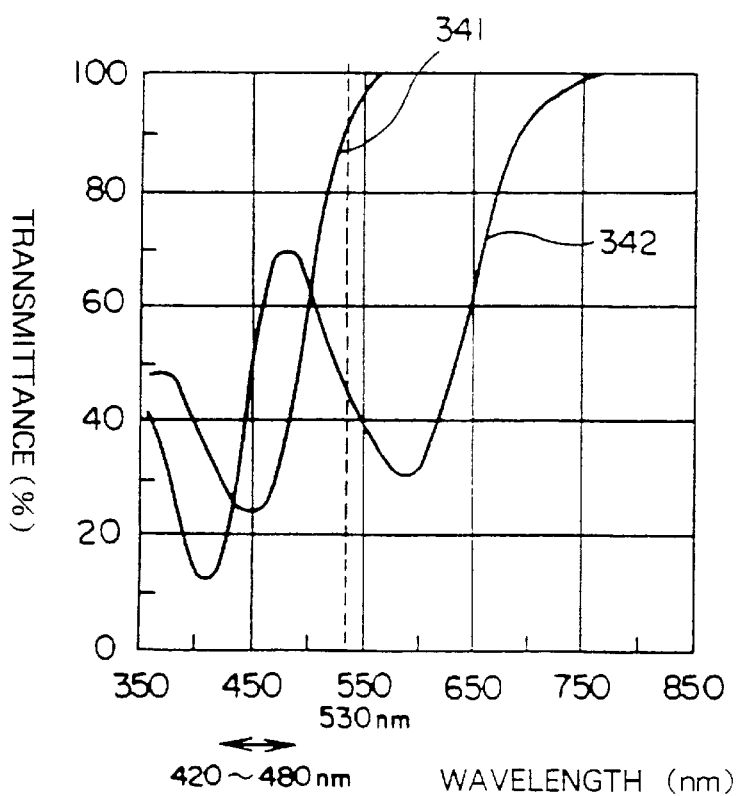
FIG. 34 is a graph showing the spectral characteristic of a diaryl ethene derivative.

FIG. 34 shows the spectral characteristic of the diaryl ethene derivative. The transmittance characteristic curve for a sufficient energy intensity (diaryl ethene A open-ring) changes from a curve 342 to a curve 341. Namely, the transmittance has a non-linear change for the energy intensity of a reproducing light beam of 530 nm wavelength.

Figure 36:
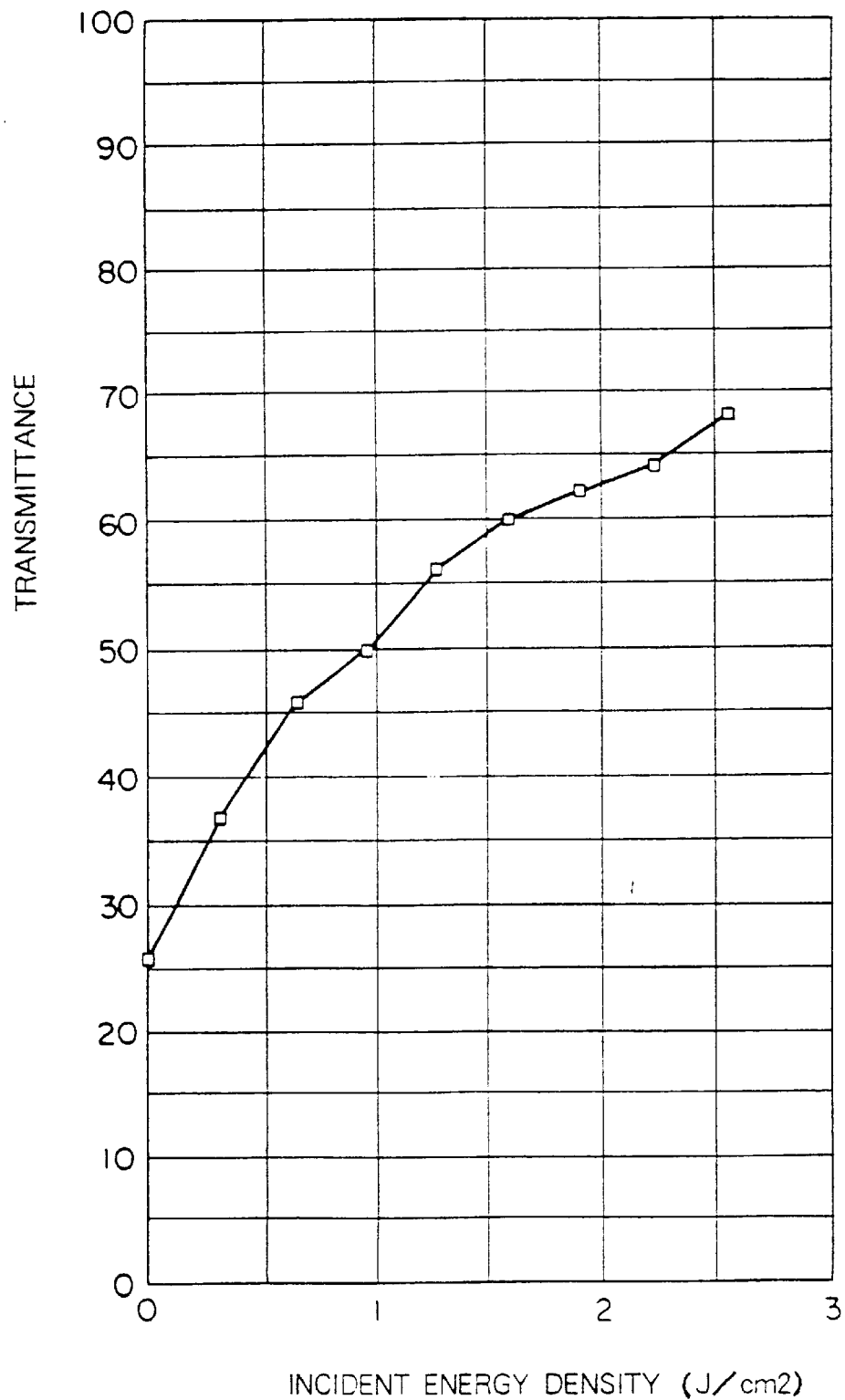
FIG. 36 is a graph showing a relationship between incident energy density and transmittance for a photochromic material.

FIG. 36 shows a change in transmittance for the energy intensity of a reproducing light beam. In the case of light having little intensity change, the energy is equivalently represented by an average power.

Figure 37:
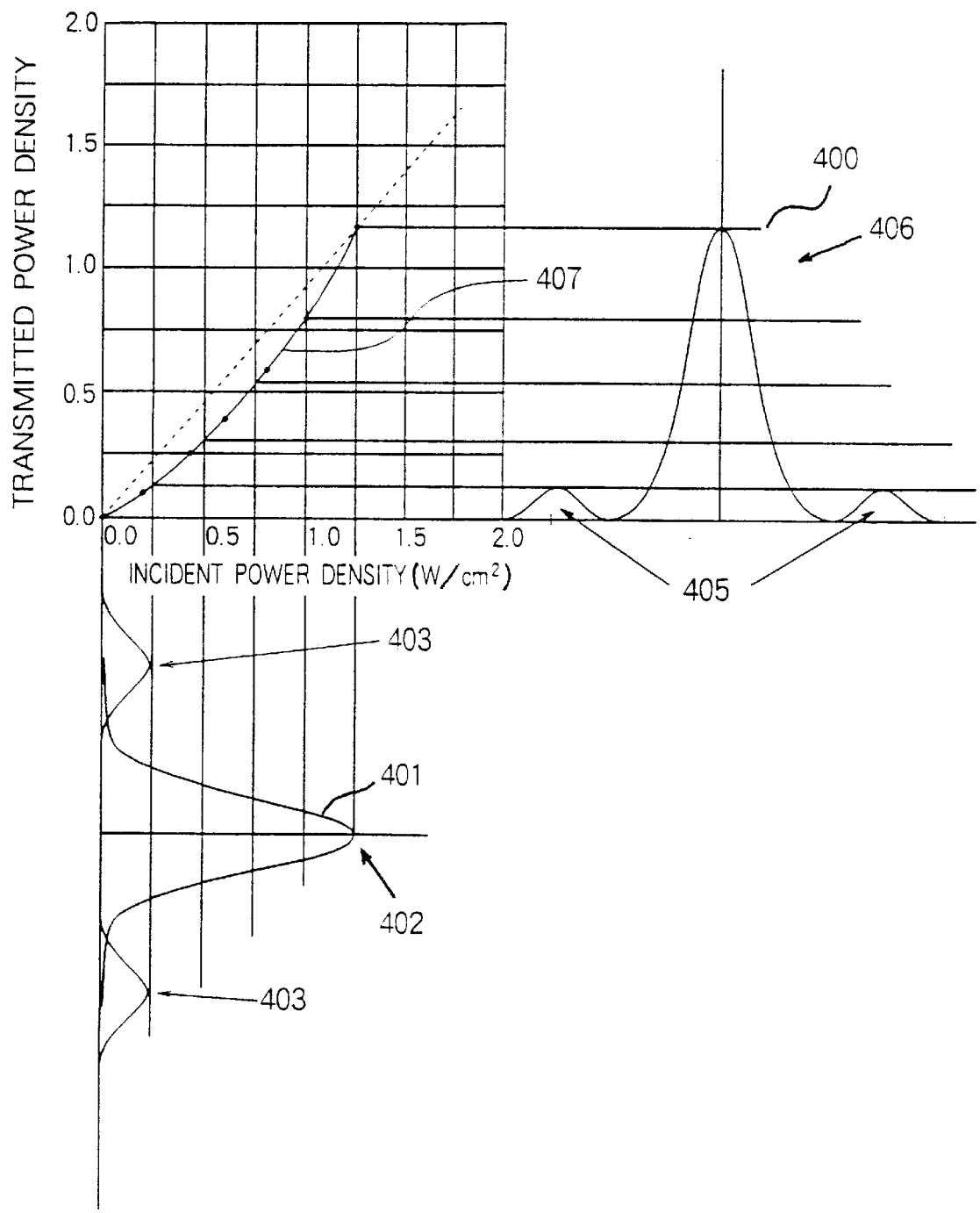
FIG. 37 is a graph showing a relationship between incident power density and transmitted light power density for the photochromic material.

The principle of signal reproduction is shown in FIG. 37. When a non-linear characteristic between the incident power density and the transmitted power density exhibits a curve 407, only a portion of the reproducing light beam having a strong intensity reaches the optical detector. Accordingly, the intensity distribution of an incident light spot 401 after transmission exhibits an intensity distribution as shown by a light spot 400. The intensity of a portion, such as a side lobe 403 of the incident light spot 401, which is weak as compared with a main lobe 402 is remarkably lowered after transmission as compared with a main lobe, or turns to a side lobe 405. Further, if the optical detector is positioned at a far field surface apart from an imaging position, a reproducing spot moves on the optical detector surface as the reproducing spot starts tracking by the optical deflector. In order to cause the non-linear effect in accordance with the movement of the spot so that only the light of the main lobe can always transmit even in such a condition, it is required that the continual excitation of the non-linear material by light different from the reproducing light should be made over the entire surface on which the spot moves.

Therefore, light 352 from a short-wavelength blue light-emitting diode 3520 is used in addition to a reproducing light 353 so that the entire surface of the non-linear material 351 is irradiated with the light 352, as shown in FIG. 35. The wavelength of the light-emitting diode is selected to fall within a wavelength region between 420 nm and 480 nm having the transmitting characteristic of the curve 342, which is another spectral characteristic (diaryl ethene A closed-ring). the irradiation with the light having such a wavelength region provides the characteristic of the curve 342. According to the curve 342, an absorbing characteristic is exhibited at the wavelength of 530 nm for detecting a signal. Namely, the non-linear material absorbs the light of 530 nm wavelength as a whole. However, if the energy intensity of the light is strong, the characteristic of the curve 341 is exhibited so that the light of 530 nm wavelength transmits. Accordingly, the non-linearity can be controlled by the power of the light from the light emitting diode with which the entire surface of the non-linear material is irradiated. In general, this kind of non-linear material has a slow response but can sufficiently cope with a response for following a tracking error. As mentioned above, a simple construction using the non-linear material makes it possible to eliminate the crosstalk from the side lobes generated due to the optical super-resolution, thereby facilitating the assemblage and adjustment of the optical system.

Figure 38A:
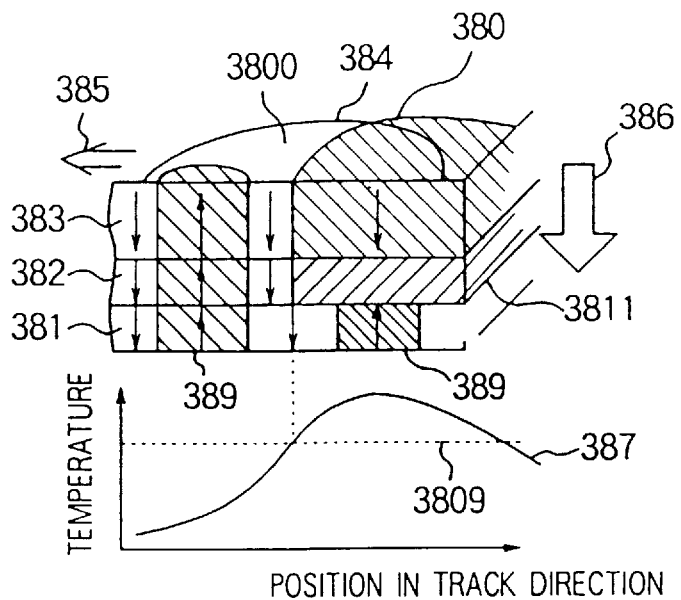
FIGS. 38A and 38B are diagrams for explaining the principle of magnetic super-resolution.

Next, explanation will be made of FAD (front aperture detection) which is one kind of magnetic super-resolution for improving the reproduction resolution in the circumference direction. The explanation will be made using FIG. 38A.

A recording medium has a structure in which a cutting layer 382 made of TbDyFe and a reproducing layer 383 made of GdFeCo are provided on a recording layer 381 such as TbFeCo or the like, as shown in FIGS. 7 and 8. When the medium having the above structure is irradiated with a light spot 384 while the spot 384 is moved in a direction indicated by arrow 385, a temperature distribution 387 on the track center on the medium has an asymmetrical or distorted profile including a higher temperature portion in the rear of the spot. Under the application of a certain external magnetic field 386, a mark 389 recorded in the recording layer 381 or the magnetization of the mark is transferred to the reproducing layer 383 through the cutting layer 382 when the temperature is low. However, when the temperature exceeds a certain value 3809, the transfer of the mark becomes impossible due to a magnetization extinguished region 3811 of the cutting layer 382. Namely, when seen from the reproducing layer 383, a mask 380 shown by oblique lines is formed in the laser spot 384, and hence the reproducing layer 383 detects the recorded mark through an aperture 3800 generated in a low temperature region. Thus, the spot 384 looks as if the size thereof is effectively reduced, whereby it is possible to improve the resolution in the circumference direction. However, the aperture 3800 has a crescent form, and hence the signal waveform obtained is asymmetrical in the direction of progression even if the mark transferred from the recorded mark is circular.

In two-dimensional equalization, which will be described later, the asymmetry can be compensated by taking in all interference factors in the front and rear, and in the right and left, and performing an operation on them. Also, the resolution of the detection signal depends on the temperature distribution and the positional deviation of the spot. As the temperature distribution is positioned near the spot center, the aperture is narrowed and the resolution is improved. For that purpose, the position having the recorded mark is pulse-wise irradiated with the reproducing light beam by use of the A/O deflector to provide a sharp temperature distribution, thereby allowing the temperature distribution to come near the spot center. The timing for modulation of the intensity of the reproducing light is made from a clock signal generated by use of the PLL circuit on the basis of pre-pits formed on the disk surface, as mentioned earlier. The timing for sample/hold of a signal is set to be in the period of irradiation with the detecting light.

Figure 38B:
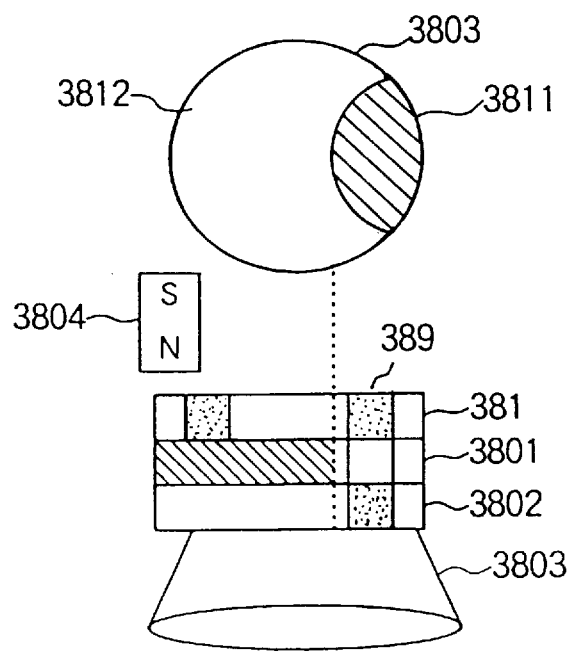

FIG. 38B is a diagram form explaining RAD (rear aperture detection), which is another kind of magnetic super-resolution. A switching layer 3801 and a reproducing layer 3802 are formed on recording layer 381 such as that explained in conjunction with FIGS. 7 and 8. In the RAD, an initializing magnetic field 3804 is applied at the front of a light spot 3803 in the progression direction to initialize the reproducing layer 381. In a place where the temperature is low, the switching layer 3801 operates to cause no transfer of a mark 389 of the recording layer 381 to the reproducing layer 3802. When the temperature becomes high due to the light spot 3803, the mark 389 of the recording layer 381 is transferred to the reproducing layer 3802. With this construction, a mask 3812 is formed and an aperture 3811 is generated in the rear of the spot 3803 in the progression direction. When the pulsed irradiation is made with a light beam for reproducing the recorded mark 389, the aperture 3811 can be positioned at the center of the light spot, thereby making it possible to reduce the asymmetry of a production waveform.

The principle for detection of the thus recorded information will be explained by use of FIGS. 39A to 39D.

Figure 39A:
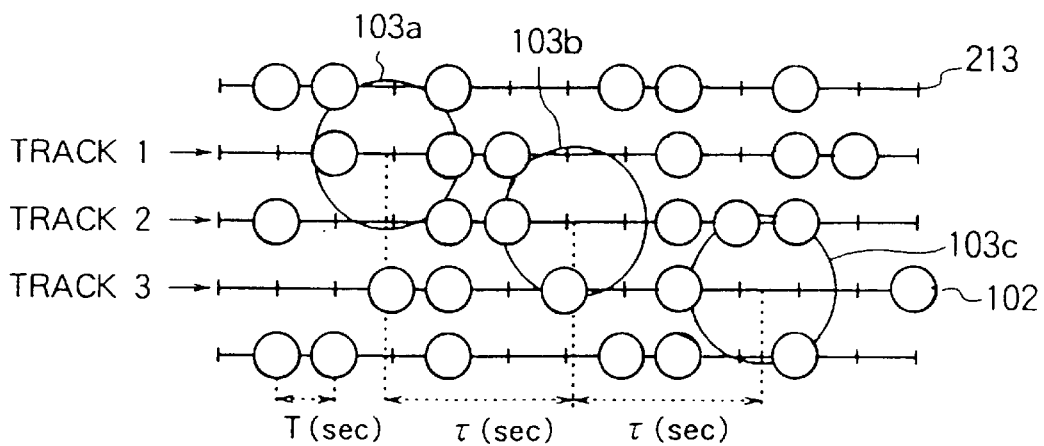
FIGS. 39A, 39B, 39C and 39D are diagrams for explaining the arrangement of marks and a signal processing in a recording/reproducing system according to the present invention.

As shown in FIG. 39A, record marks 102 are recorded in accordance with an NRZ (non-return-to-zero) rule in which the presence and absence of a mark at a lattice point 213 correspond to "1" and "0" of recording data, respectively. Accordingly, a detection signal includes only two levels.

Figure 39B:
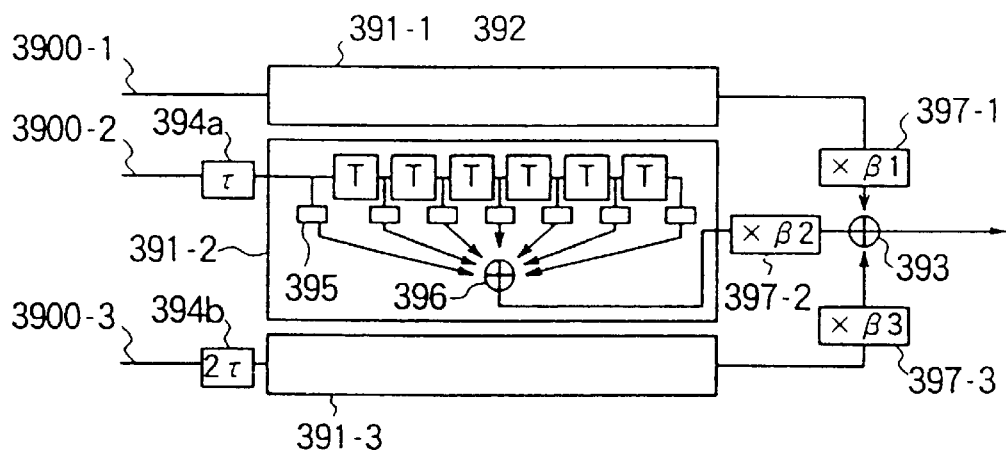
Figure 39C:
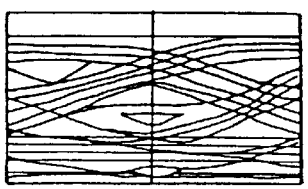

FIG. 39C shows a signal (or eye pattern) of the track 2 detected from a spot 103b. The eye level is scarcely opened due to the crosstalk from the adjacent tracks 1 and 3 and it is therefore not possible to accurately detect data.

Figure 39D:
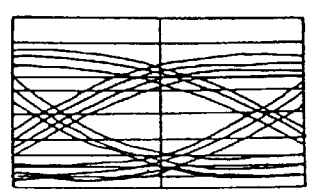

It is necessary to process the signal so that the eye is opened, as shown in FIG. 39D, thereby allowing the accurate detection of data.

FIG. 39B shows the construction of a two-dimensional equalization processing circuit that compensates for the crosstalk to obtain the signal of FIG. 39D from the signal of FIG. 39C. In this circuit, the result of operation of the inverse matrix of K after the learning of interference factors, and signals from the tracks 1, 2 and 3, are used to determine an operation factor for eliminating the amount of interference.

In the two-dimensional equalization processing circuit, signals x(t) 3900-2 and 3900-3 reproduced from the respective tracks 1, 2 and 3 are passed through 7-tap transversal filters 391-1, 392-2 and 391-3. Each transversal filter 391 is provided with delay circuits 392, attenuators 395 and an adder 396, and shapes a signal waveform for each track. Thereafter, signals g(t) from the respective tracks are weighted by weighting circuits 397-1, 397-2 and 397-3 and are then added by an adder circuit 393. The factors of the delay circuits and the attenuators passing the signal from each track, and the weighting factors multiplied in the weighting circuit 397, are determined from the inverse matrix, as mentioned above. Delay circuit 394a and 394b have delay times corresponding to the distance r (sec) between the reproducing spots 103.

In FIG. 39A, the interval between lattice points, the interval between tracks, and the mark diameter are 0.25 microns, 0.3 microns, and 0.22 microns, respectively. It is assumed that the time corresponding to the lattice point interval is T and the time interval between the three spots is τ. For two-dimensional signal processing, a time delay is given beforehand in order to compensate for the time delay between tracks. When the whole of the signal processing is made in a digital fashion, a clock signal generated from the PLL circuit can be used, and hence it is easy to control a time delay having an interval of τ.

Unless a spot in the circumference direction is made to have the effect of magnetic super-resolution, the detection of a signal from the lattice having a period of 0.5 microns is impossible, since the spot diameter in the circumference direction is on the order of 0.95 microns. Therefore, a partial response well known in the field of transmission paths is applied. The simplest partial response in an optical disk exhibiting a gentle response characteristic over an area from the DC region to a high frequency region is a response characteristic called PR(1, 1). The PR(1, 1) characteristic is a characteristic that when an optical disk is regarded as being a transmission path, a response to an input pulse exists in only two detecting time slots and no response appears in other slots.

Figure 41:
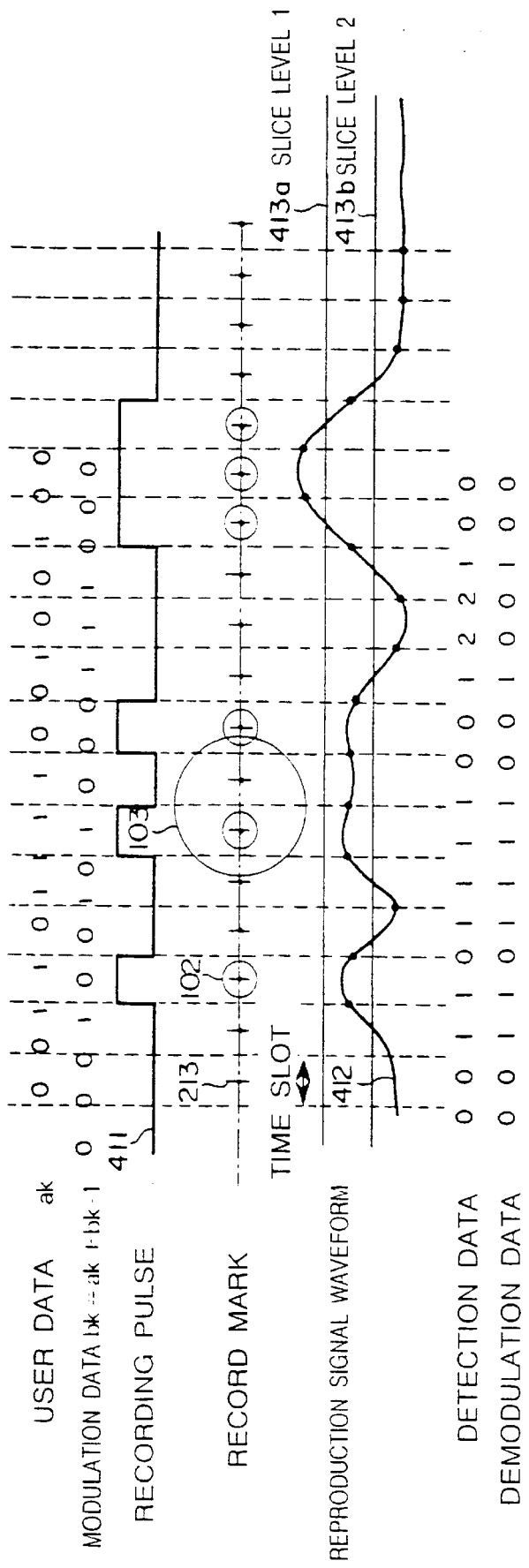
FIG. 41 is a chart for explaining a partial response (1, 1) characteristic in an optical disk.

The flow of a signal processing in PR(1, 1) will be explained by use of FIG. 41. User data ak is converted into modulation data bk by a process using a precoder. The precoder has a function of applying the inverse characteristic of an optical disk to recording data beforehand, in order to prevent error propagation caused by defects on the optical disk or the like.

A recording pulse signal 411 is generated in accordance with the modulation data so that record marks are recorded on lattice points 213 in accordance with the recording pulse signal 411 and on the basis of the clock signal. When the effective size of a reproducing spot 103 is as shown in FIG. 41, it is not possible to resolve a reproduction signal waveform 412 into marks even if one lattice point interval is reserved between marks. However, since a detection (or reproduction) signal level has an intermediate value of a saturation level, it is possible to know the arrangement of marks.

The saturation level is generated when a plurality of marks are continuously arranged. It can be understood that the detection level may take one of three values in accordance with the interference between marks. Two slice levels 413a and 413b are provided for detecting one of the three values which the detection level may take. Thereby, one of the three values separated by the two slice levels is detected. The obtained three-valued data is subjected to modulo 2 operation to provide binary demodulation data. Thereby, the detection of a signal becomes possible even at a density with which the resolution is deteriorated.

In the above explanation, the processing of a signal from one track is taken as an example. In the present invention, however, a waveform preferable to the partial response cannot be detected due to an interference from adjacent tracks. Means for obtaining the preferable waveform will now be mentioned.

Figure 42:
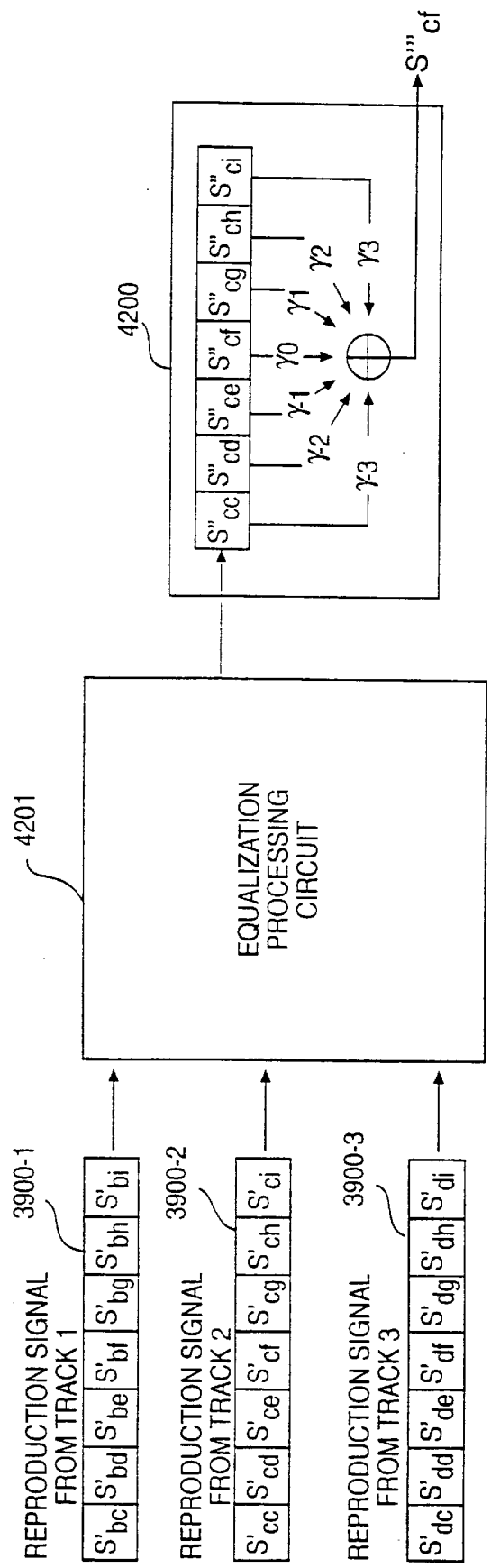
FIG. 42 is a diagram for explaining a partial response processing in the present invention in which interference from adjacent tracks is eliminated.

FIG. 42 shows an arrangement for inputting the detection signals 3900 from the three spots to a two-dimensional equalization circuit 4201. The detection signal 3900-1 ($S'_{bc}$ to $S'_{bi}$) from the track 1 is input in the order of time. The detection signal 3900-2 ($S'_{cc}$ to $S'_{ci}$) from the track 2 and the detection signal 3900-3 ($S'_{dc}$ to $S'_{di}$) from the track 3 are also input to the two-dimensional equalization circuit 4201. From these signals is obtained a signal 4200 ($S''_{cc}$ to $S''_{ci}$) for the track 2 in which the interference from adjacent marks is eliminated at each timing. This signal 4200 corresponds to the arrangement of reproduction signals from isolated marks and does not include the amounts of interference necessary for the partial response. In order to provide the PR(1, 1) characteristic, the signals $S''_{cc}$ to $S''_{ci}$ are newly provided with the amounts of interference $\gamma_{-3}$ to $\gamma_3$ between adjacent marks and are then added. As a result, there is obtained a signal $S'''_{cf}$ which is free of the interference from adjacent tracks and has the optimum partial response characteristic. This signal corresponds to a signal from the middle mark in the array of 21 marks enclosed by a dotted line in FIG. 40.

Figure 43B:
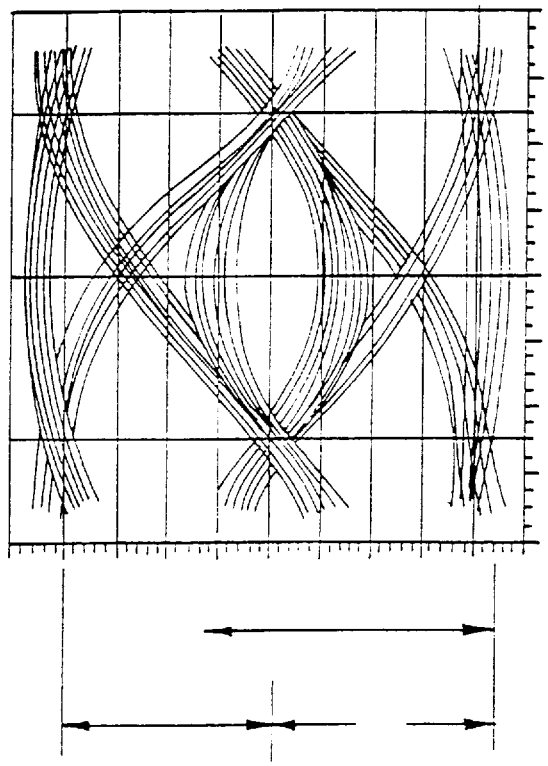
FIGS. 43A and 43B are diagrams of partial response waveforms in the present invention when the interference from adjacent tracks is eliminated and when the interference from adjacent tracks is not eliminated.
Figure 43A:
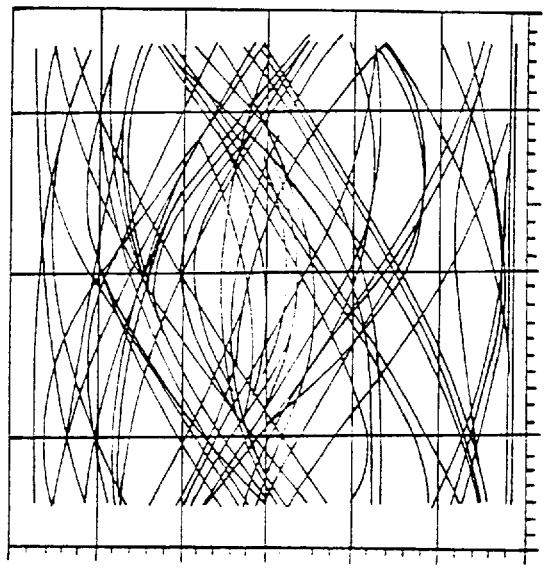

FIGS. 43A and 43B show the result of simulation of the equalization processing shown in FIG. 42. A signal waveform corresponding to $S'''_{cf}$, which can be regarded as being continuous, is determined by making the calculation at small intervals of 0.0125 microns corresponding to a pitch in the case where the lattice point interval is equally divided into 20 parts.

FIG. 43A shows a waveform when a random pattern is arranged on the tracks 1, 2 and 3, only the track 2 is reproduced and only a signal processing for partial response is performed. It is obvious that an eye aperture necessary for signal detection cannot be obtained due to the interference from adjacent tracks.

FIG. 43B shows the result in the case where a signal processing for partial response is performed after signals from the track 1 and 3 are detected to eliminate the interference between adjacent marks by the above-mentioned two-dimensional equalization. It is obvious that an eye aperture 4300 sufficiently large as compared with the case of FIG. 43A is obtained and three values can surely be discriminated at signal detecting points 4302 by use of two slice levels 413a and 413b. As compared with NRZ, a recording position is a lattice point but a signal detecting point is an intermediate point between lattice points.

The simulation has shown the situation of a waveform processing in a form close to a continuous waveform. In the present embodiment, however, the whole of a signal processing is a digital processing synchronous with a clock signal. Therefore, the lattice point interval T corresponds to an interval between time slots and a middle point between lattice points is taken as the time slot. Accordingly, although in the foregoing embodiment a signal is sampled and held at each lattice point, signal processing in the present embodiment is performed by sampling and holding each reproduction/detection signal for every time slot. Reference numeral 4301 corresponds to the amplitude of a reproduction signal from an isolated mark.

In the foregoing embodiments, the optical super-resolution effect has been used for the track radius direction. However, for the magnetic transfer structure shown in FIG. 9, the magnetic super-resolution is difficult. Therefore, the above-mentioned partial response has to be used. However, the present invention enables optical super-resolution in the circumference direction in order to attain a still higher density and to realize 10Gb/in$^2$ with a margin. Namely, it is possible to isotrophically make the optical super-resolution effect by using a circular shield plate or a circular phase plate as the optical filter. If an elliptical form is used, it is possible to cope with a change in track pitch or lattice point interval. The influence of side lobes can be eliminated by applying a non-linear transmissive material on a detector surface, as mentioned above.

Next, an embodiment for performing reproduction with high SN will be shown in the following.

The principle of detection with high SN is shown in FIGS. 44A to 44D. FIG. 44A shows an appearance on medium, FIG. 44B a clock signal, FIG. 44C the intensity of a laser beam with which the medium is irradiated, and FIG. 44D a temperature distribution on the medium. The irradiation of the medium with a reproducing spot 4401 is as follows. In order to extract a tracking signal and a clock signal, a sample region 500 having pre-pit marks 4400 formed therein is irradiated with the usual DC light 441 to perform reproduction. A data region 501 is irradiated with a light pulse 442 having a peak power level 503 higher than a reproducing level 502 at a timing synchronous with the lattice point, and the reelected light is detected at a timing 504 synchronous with the lattice point. A gap region 505 is provided between the sample region 500 and the data region 501.

The reason why the reproduction with high SN is possible will now be given.

Figure 45:
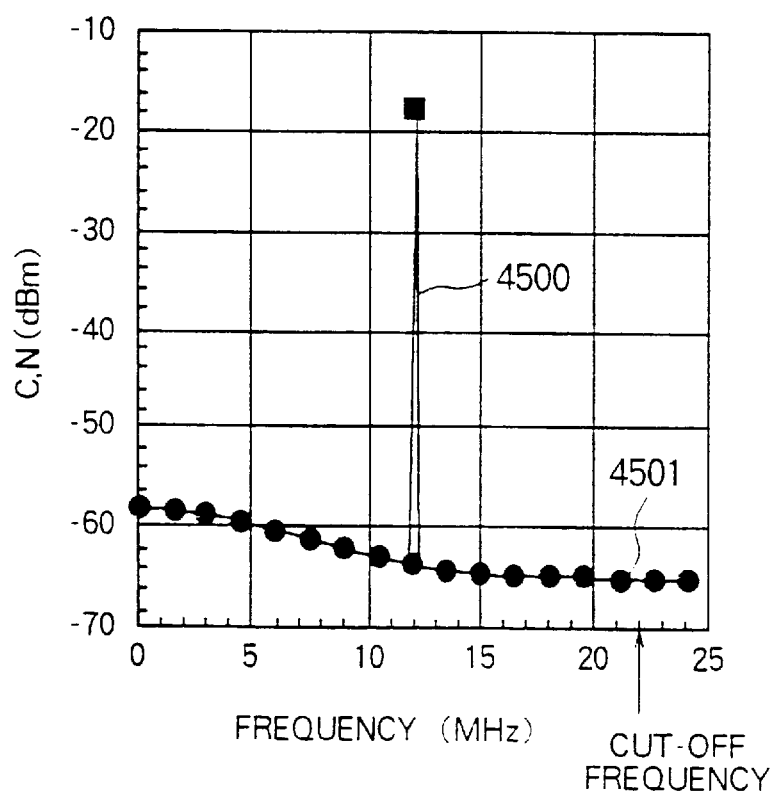
FIG. 45 shows the frequency spectra of signal and noise levels.

FIG. 45 shows a frequency spectrum measured by a spectrum analyzer in the case where a repeating pattern having the highest repetition frequency of 12.5 MHz (or 0.4 $\mu$m marks) is reproduced at a linear velocity V of 10 m/s and with a reproducing light power of 1 mW for DC irradiation by a reproducing system in which the wavelength $\lambda$ is 532 nm and the numerical aperture NA of the focusing lens is 0.6. The multiple period of an interval between lattice points corresponds to the highest repetition frequency. A signal 4500 corresponding to the mark repetition period corresponds to a signal component C, and a signal 4501 of a base level corresponds to total noise N.

Figure 46:
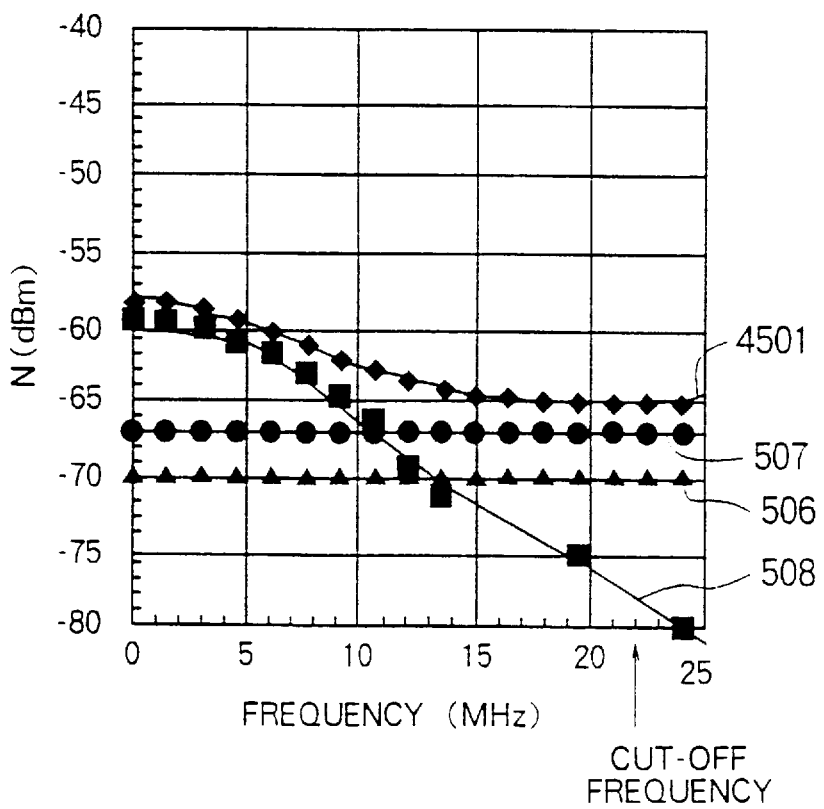
FIG. 46 shows the frequency spectra of individual noise levels.

FIG. 46 shows the measured values of spectra of various kinds of noise including the noise level 4501 shown in FIG. 45. The reproducing light power is 1 mW. The noise component 4501 is composed of system noise 506 which includes amplifier noise, shot noise 507 which is generated in the light detector, and disk noise 508 which includes modulation noise caused by the variations of marks at the time of recording. Since the SHG laser is used, the noise of the laser itself is negligible. The result of measurement shows that the disk noise 508 is dominant in a low frequency region lower than a frequency $f_{min}$=11 MHz whereas the shot noise 507 is dominant in a high frequency region.

Figure 47:
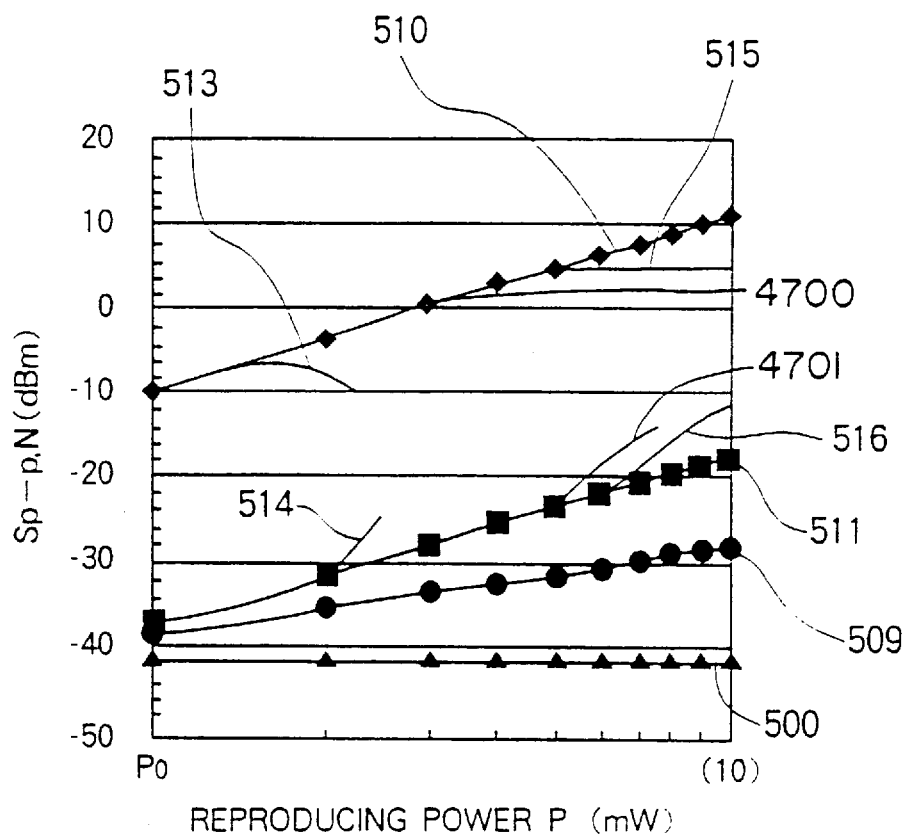
FIG. 47 is a graph showing the reproducing power-dependent characteristics of signal and noise levels.

FIG. 47 shows the relation of the signal level $S_{p-p}$ and the amounts N of various types of noise with the power of a reproducing light beam focused on a medium surface. The signal level $S_{p-p}$ corresponds to a value obtained by multiplying the peak value of the signal 4500 of FIG. 45 by 2 √2, and the noise N corresponds to the noise amount integrated in a region from the frequency 0 to the cut-off frequency shown in FIG. 46. The abscissa is normalized on a logarithmic scale with the reproducing power $P_o$ taken as 1. A curve 509 is the theoretical curve of the shot noise represented by 10×log(P/$P_o$), a curve 510 the theoretical curve of the signal level represented by 20×log(P/$P_o$), a curve 511 the theoretical curve of the disk noise represented by 20×log(P/$P_o$), and a curve 500 the theoretical curve of the system noise.

Taking only a change in light amount on the detector into consideration, the system noise 500 does not depend on the reproducing light power. On the other hand, the shot noise is proportional to the reproducing light power P or exhibits the theoretical curve 509. The signal level and the disk noise are proportional to the second power of the reproducing light power or exhibit the theoretical curves 510 and 511, respectively. By increasing the reproducing power, the shot noise dominating the high frequency region of a signal band can be reduced as compared with the disk noise, thereby making it possible to reduce the noise amount determined by the integration in the signal band.

Fib. 48 shows the relationship between the ratio of reproduction signal $S_{p-p}$ to total noise $N_{rms}$ and the reproducing power. A curve 512 is a theoretical curve showing the relation with the reproducing power at the time of DC irradiation with the reproducing light, a curve 517 includes the measured values in the case where the DC irradiation is made with reproducing light at a linear velocity of 20 m/s, and a curve 518 includes the measured values in the case where the pulsed irradiation is made with the reproducing light at a linear velocity of 10 m/s. The signal band at this time is $f_{max}$=V/λ/2NA) [MHz]=22.5 MHz, which is an optical cut-off frequency.

As is apparent from the theoretical curve 512, SN is improved by 1.8 dB when the reproducing power is increased from 1 mW to 2 mW, and by 2.8 dB when it is increased to 4 mW. In the actual system, however, the following problems are generated when the reproducing power is increased.

The problems will be explained returning to FIG. 47. In FIG. 47, a curve 513 includes the measured values of the signal level in the case where the DC irradiation is made with the reproducing light at a linear velocity of 10 m/s, and a curve 514 includes the measured values of the disk noise level in the case where the DC irradiation is made with the reproducing light at the linear velocity of 10 m/s.

Figure 49:
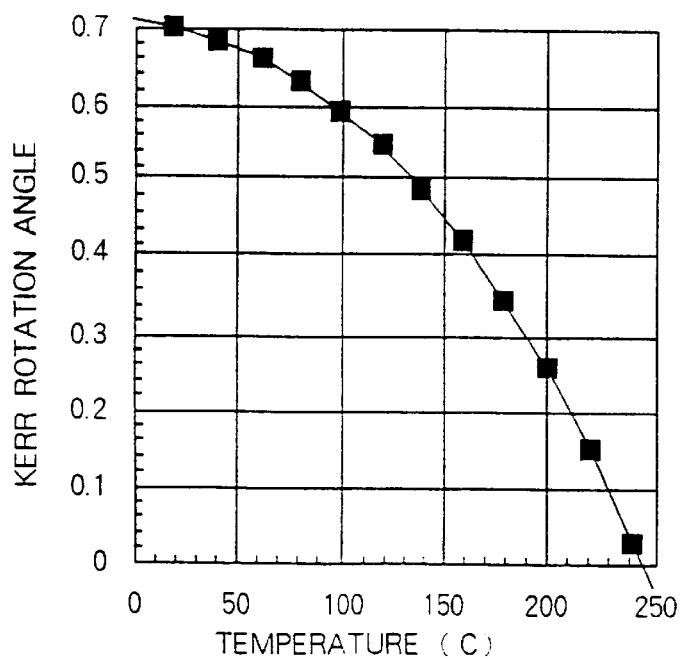
FIG. 49 is a graph showing the temperature-dependent characteristic of the Kerr rotation angle.

A first problem is that, as shown by the measured curve 513, the signal level becomes lower than the theoretical curve 510. The Kerr rotation angle of a magnetic film governing the signal level decreases with an increase in temperature, as shown in FIG. 49. Therefore, the increase of the reproducing power causes an increase in the temperature of the film surface, thereby lowering the signal level.

A second problem is that, as shown by the measured curve 514, the disk noise level has a large increase as compared with the theoretical curve 511 as the reproducing power is increased. This is because when the temperature is increased, the magnetization of the magnetic film becomes unstable, thereby increasing the disk noise.

To solve the above problems, there may be considered a method in which the linear velocity is increased so that the temperature of the film surface is not increased even if the reproducing power is increased.

Referring to FIG. 47, curves 515 and 516 are the measured values of the signal level and the measured values of the disk noise level in the case where the DC irradiation with the reproducing light is made with the doubled linear velocity of 20 m/s. The curves 515 and 516 show that the reproducing power can be increased up to the order of 3 mW. However, the measured SN for the reproducing power demonstrates an improvement of only 0.5 dB, as shown by the measured curve 517 in FIG. 48. The reason is as follows. The signal band must be increased in proportion to the increase of the linear velocity so that the noise amount in the band of the shot noise dominating the high frequency region increases, as is apparent from FIG. 46. As a result, SN is deteriorated. This phenomenon will now be explained.

Figure 50:
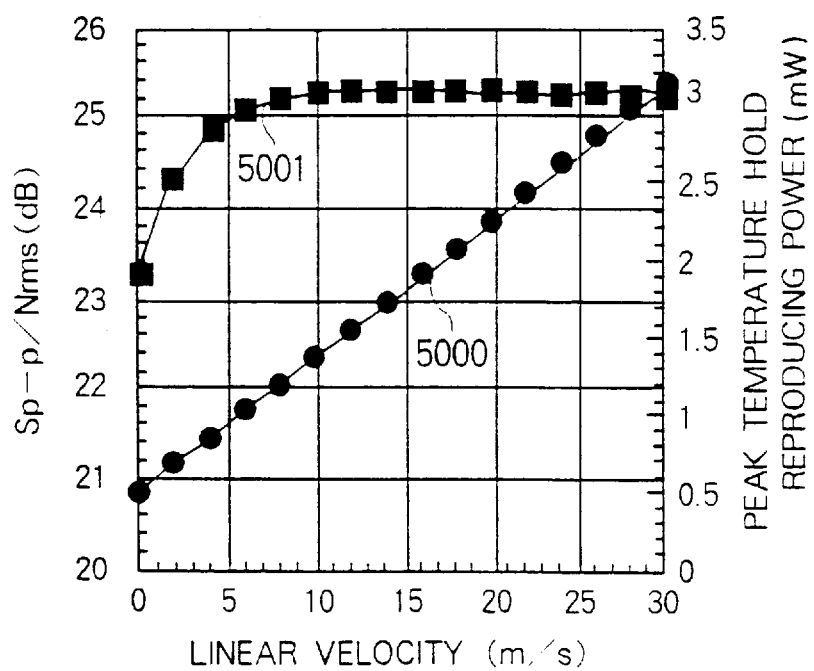
FIG. 50 is a graph showing a relationship between linear velocity and peak temperature holding reproducing power, together with SN determined at that time.

FIG. 50 shows an SN 5001 for the linear velocity obtained by determining for each linear velocity, and a reproducing power 5000 with which the peak temperature of a film surface is held, for determining SN for the determined reproducing power. From this result, it is apparent that almost no improvement of SN is obtained even if the linear velocity is increased from 10 m/s.

Upon the above consideration, in the present embodiment, the irradiation with a light pulse is made at a data detecting point at the time of reproduction in order that the reproducing power is increased without increasing the signal band. Thereby, the signal is reproduced with no increase of the film surface temperature. As shown in FIG. 44C, the lattice point is irradiated with a reproducing pulse having a third intensity level $P_p$ 503 higher than the reproducing level $P_{dc}$ 502 of ordinary DC light from the light source.

Figure 51:
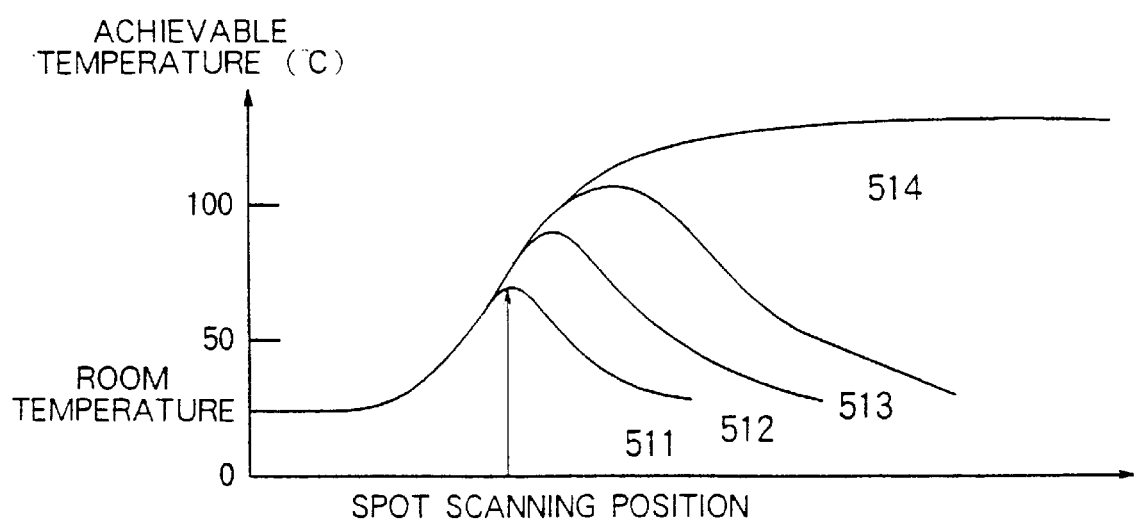
FIG. 51 is a graph showing temperature distributions measured at the time of DC irradiation and at the time of pulsed irradiation.

FIG. 51 shows the temperature distributions on a recording film surface measured at the time of irradiation with DC light, and at the time of irradiation with various pulses having different pulse widths under the above recording/reproducing condition. The pulsed irradiation having pulse widths of 10 ns, 20 ns and 30 ns, and the DC irradiation, are made with a peak value of irradiation power and a linear light spot velocity selected to be 2 mW and 10 m/s, respectively. A curve 511 represents an achievable temperature in the case where the pulse width is 10 ns. A curve 512 represents an achievable temperature in the case where the pulse width is 20 ns. A curve 513 represents an achievable temperature in the case where the pulse width is 30 ns. A curve 514 represents an achievable temperature in the case where the DC irradiation is made. It is apparent that in the case of the pulse width of 10 ns, the peak temperature is half that in the case of the DC irradiation, and hence the irradiation with a reproducing power of 2 mW at 10 m/s is possible.

Figure 48:
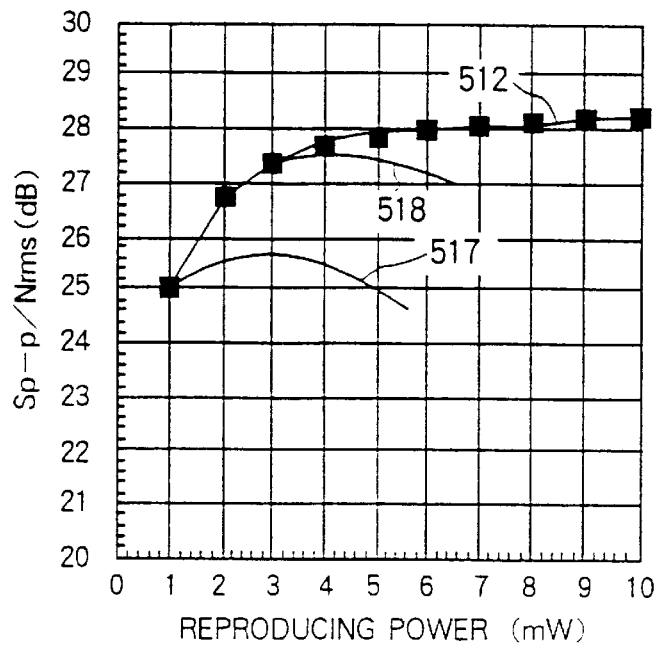
FIG. 48 is a graph showing the reproducing power-dependent characteristic of SN.

In FIG. 47, curves 4700 and 4701 represent the measured values of a reproduction signal and the measured values of disk noise in the case where the pulsed irradiation with reproducing light at a linear velocity of 10 m/s is made. Similarly, the curve 517 in FIG. 48 represents the measured curve of SN relative to the reproducing power. As is apparent from those curves, SN can be improved by 2.3 dB with a reproducing power of 3 mW at a linear velocity of 10 m/s.

At the time of the irradiation shown in FIG. 44C, the following problem is generated. When the switch-over from the DC irradiation of the sample region 500 to the pulsed irradiation is made, the temperature level is increased due to the remaining heat at a lattice point caused by the DC irradiation (see 4400 in FIG. 44D). At the time of the next pulsed irradiation, however, the temperature level is lowered since the remaining heat becomes small (see 4401). Further, the temperature value after several pulses comes to a steady value. In order to eliminate such variations in temperature level, the gap region 505 is provided between the sample region 500 and the data region 501.

FIGS. 52A–52D show a method of making the temperature level constant without providing the gap region. Each lattice point is irradiated with a reproducing pulse having a third intensity level 503 higher than the reproducing level 502 of DC light from the light source. A pre-heating pulse having a second intensity level 519 higher than the reproducing level 502 is applied between lattice points. A period having the intensity of zero is sandwiched between the pulse of the level 503 and the pulse of the level 512. By intensity-modulating the reproducing light as shown in FIG. 52C, the temperature level can be made constant, as shown in FIG. 52D, even in the construction in which the light spot enters directly form the sample region 500 into the data region 501.

A specific operation at the time of reproduction will be described next.

At the time of reproduction, the sample region 500 for extracting a tracking signal and a clock signal is irradiated with DC light for signal reproduction from the region 500. For the data region 501, the recording circuit shown in FIGS. 24, 25 and 26 is used even at the time of reproduction so that the A/O driver circuit 377 shown in FIG. 15 is driven by each recording strobe pulse 221 at a timing synchronous with a lattice point at the time of reproduction to modulate the reproducing light. Three reproducing spots 4400 are provided by the diffraction grating. In order that each reproducing spot yields a pulse at a lattice point, pulses from the respective recording strobe signals 221 are mixed to modulate the A/O driver circuit 377.

However, when one spot is subjected to the pulsed irradiation of a lattice point, the other two spots will be subjected to the pulsed irradiation of locations other than the lattice point, thereby raising the temperature. Practically, the pulse width is selected to be on the order of ⅓ in order that the temperature is not raised even if the pulsed irradiation with the other two spots is made. Alternatively, the diffraction grating 311 shown in FIG. 15 can be controlled rotationally so that the three spots are always positioned at intervals of lattice points in the spot scanning direction at the same instant of time. Thereby, since the pulsed irradiation of lattice points with the three spots is effected by one recording strobe pulse 221, it is possible to satisfy the reproducing pulse condition by one spot condition. On the other hand, three light sources as reproducing light sources and three A/O driver circuits may be used in such a manner that they are independently modulated.

A reproducing circuit can. use the construction of FIGS. 28 and 29 as they are. Reflected light in the period of irradiation with the reproducing pulse is detected at a timing 504 synchronous with the lattice point, and the level is detected by sample-and-hold. It is not required that the sample clock 265 should be the same as the instant of time of pulsed irradiation. Namely, a learning region may be provided to obtain optimization by making a positional control so that SN takes the maximum value. In this case, the optimization can also be made by learning a time constant at the time of sampling.

In this embodiment, the reproducing pulse condition for reproduction based on pulsed irradiation has been defined by the peak temperature of the film surface. However, since the mark has a definite width, further optimization is possible by taking the temperature distribution in the width of a mark into consideration. Also, in the case where a partial response signal processing is performed, the pulsed irradiation with detecting points in that class may be made. If the pulse condition is optimized for the effective diameter of an optical super-resolution spot, that is, λ/NA×(spot reduction ratio by optical super-resolution: 0.8 in this embodiment), the combined use of this optimization is possible.

According to the present invention, there is an improvement in density of about one digit (or figure) or more than that which can be realized using presently available light sources, optical elements and recording/reproducing techniques though the recording density in the existing optical disks is on the order of 1 Gbit/in$^2$.

We claim:

1. A high density information recording/reproducing method, comprising the steps of:

irradiating a medium with a recording laser beam of a first wavelength to form a recording spot on said medium by use of a super-resolution optical system, so that a mark having a size equal to or smaller than one fourth of said recording spot is formed on said medium by a thermal energy of said recording spot; and reproducing a signal from said mark using a reproducing laser beam of a second wavelength shorter than said first wavelength;

wherein said irradiating step performs two-dimensional recording to arrange mutually similar circular marks at lattice points of a two-dimensional lattice on said medium which extend in a track direction and in a radius direction perpendicular to the track direction.

2. A high-density information recording/reproducing method according to claim 1, wherein the signal reproduced from said mark is used to perform a signal processing, thereby detecting information.

3. A high-density information recording/reproducing method according to claim 2, further comprising the steps of generating a recording clock signal and a reproducing clock signal from clock marks discretely provided on said medium, and detecting a tracking error signal from wobbling marks provided on said medium.

4. A high-density information recording/reproducing method according to claim 1, further comprising the step of irradiating said medium beforehand with a strong laser beam to generate a localized structure relaxation, thereby weakening the coercive force, so that a recording sensitivity characteristic of said medium is locally changed in a small region to form a small mark which does not depend on the form of the recording spot.

5. A high-density information recording/reproducing method according to claim 1, further comprising the step of providing the medium with a minute concave/convex pattern on the substrate of an optical disk by injection, to provide nuclei for the formation of magnetic marks, thereby facilitating the formation of localized recording marks, whereby there is formed a small mark which does not depend on the form of the recording spot, so that a recording sensitivity characteristic of said medium is locally changed in a small region to form a small mark which does not depend on the recording spot.

6. A high-density information recording/reproducing method according to claim 1, wherein at least one spot is positioned on formed marks by use of a sample servo so that a detection signal, when a light spot is positioned on a lattice point, is sampled and held in accordance with a clock signal generated from a buried mark; the method further comprising the steps of:

determining beforehand the amount of interference from an adjacent lattice point in a learning region, and removing the amount of interference from the detection signal after a sample-and-hold is performed to detect the presence/absence of a mark recorded at the lattice point.

7. A high-density information recording/reproducing method, comprising the steps of:

irradiating a medium with a recording laser beam of a first wavelength to form a recording spot on said medium by use of a super-resolution optical system, so that a mark having a size equal to or smaller than one fourth of said recording spot is formed on said medium by a thermal energy of said recording spot; and reproducing a signal from said mark using a reproducing laser beam of a second wavelength shorter than said first wavelength;

wherein said medium is provided before said irradiating step with a buried mark layer in which small marks having a predetermined form are recorded, and the recording spot is positioned with respect to said buried mark layer to record information marks in a reproducing layer of the medium by the recording spot in accordance with whether or not the buried mark is to be magnetically transferred.

* * * * *